United States Patent
Ko et al.

(10) Patent No.: US 10,084,521 B2
(45) Date of Patent: Sep. 25, 2018

(54) METHOD AND APPARATUS FOR TRANSMITTING SIGNAL IN WIRELESS COMMUNICATION SYSTEM

(71) Applicant: LG ELECTRONICS INC., Seoul (KR)

(72) Inventors: Hyunsoo Ko, Seoul (KR); Jaehoon Chung, Seoul (KR); Jiwon Kang, Seoul (KR); Ilmu Byun, Seoul (KR); Kilbom Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 60 days.

(21) Appl. No.: 15/029,194

(22) PCT Filed: Nov. 4, 2014

(86) PCT No.: PCT/KR2014/010514
§ 371 (c)(1),
(2) Date: Apr. 13, 2016

(87) PCT Pub. No.: WO2105/065154
PCT Pub. Date: May 7, 2015

(65) Prior Publication Data
US 2016/0241323 A1    Aug. 18, 2016

Related U.S. Application Data

(60) Provisional application No. 61/899,815, filed on Nov. 4, 2013, provisional application No. 61/909,370, filed on Nov. 26, 2013.

(51) Int. Cl.
*H04L 5/00* (2006.01)
*H04B 7/06* (2006.01)
(Continued)

(52) U.S. Cl.
CPC ......... *H04B 7/0617* (2013.01); *H04B 7/0452* (2013.01); *H04B 7/0626* (2013.01);
(Continued)

(58) Field of Classification Search
CPC ...... H04B 7/04; H04B 7/0691; H04B 7/0695; H04B 7/0452; H04B 7/0626;
(Continued)

(56) References Cited

U.S. PATENT DOCUMENTS 8,797,212 B1 *   8/2014   Wu ..................... H01Q 3/2605
                                                      342/368
9,237,582 B2     1/2016   Seol et al.
(Continued)

FOREIGN PATENT DOCUMENTS

EP     2247138         11/2010
EP     2432149 A2      3/2012
(Continued)

OTHER PUBLICATIONS

PCT International Application No. PCT/KR2014/010514, Written Opinion of the International Searching Authority dated Feb. 24, 2015, 19 pages.
(Continued)

*Primary Examiner* — Charles C Jiang
*Assistant Examiner* — Kyaw Z Soe
(74) *Attorney, Agent, or Firm* — Lee Hong Degerman Kang Waimey

(57) ABSTRACT

The present invention relates to a wireless communication system. A method for transmitting a signal from a base station in a wireless communication system supporting multiuser-multiple input and multiple output (MU-MIMO), according to one embodiment of the present invention, comprises the steps of: generating beams of subgroups including a plurality of terminals using analog beamform-
(Continued)

ing; differentiating signals transmitted to each of the terminals using digital beamforming; and transmitting, to the terminals, signals generated based on analog beamforming and digital beamforming, wherein the weight of analog beamforming may be determined based on channel state information obtained through an uplink reference signal.

14 Claims, 25 Drawing Sheets

(51) Int. Cl.
*H04B 7/0452* (2017.01)
*H04W 72/04* (2009.01)

(52) U.S. Cl.
CPC ......... *H04B 7/0691* (2013.01); *H04B 7/0695* (2013.01); *H04L 5/0023* (2013.01); *H04L 5/0048* (2013.01); *H04W 72/0413* (2013.01)

(58) Field of Classification Search
CPC ....... H04B 7/0617; H04L 5/00; H04L 5/0023; H04L 5/0048; H04W 72/04; H04W 72/0413
See application file for complete search history.

(56) References Cited

U.S. PATENT DOCUMENTS

| | | | |
|---|---|---|---|
| 2009/0225728 A1 | 9/2009 | Tao et al. | |
| 2009/0252112 A1 | 10/2009 | Shimomura et al. | |
| 2010/0149961 A1* | 6/2010 | Lee | H04L 5/0007 370/204 |
| 2010/0189091 A1 | 7/2010 | Poon | |
| 2011/0019573 A1 | 1/2011 | Ezri | |
| 2011/0053596 A1* | 3/2011 | Wohlert | H04W 36/04 455/436 |
| 2011/0291891 A1* | 12/2011 | Nsenga | H04B 7/0617 342/373 |
| 2012/0033761 A1* | 2/2012 | Guo | G01S 3/023 375/316 |
| 2012/0063373 A1* | 3/2012 | Chincholi | H04L 5/001 370/281 |
| 2012/0264469 A1 | 10/2012 | Dartois et al. | |
| 2012/0287882 A1 | 11/2012 | Kim et al. | |
| 2013/0039445 A1 | 2/2013 | Hwang | |
| 2013/0051364 A1* | 2/2013 | Seol | H04W 16/28 370/331 |
| 2013/0057432 A1* | 3/2013 | Rajagopal | H01Q 3/26 342/368 |
| 2013/0094392 A1 | 4/2013 | Kim et al. | |
| 2013/0202054 A1 | 8/2013 | Khan et al. | |
| 2013/0258972 A1 | 10/2013 | Kim et al. | |
| 2013/0286960 A1* | 10/2013 | Li | H04W 72/042 370/329 |
| 2013/0294533 A1 | 11/2013 | Kim et al. | |
| 2013/0295946 A1* | 11/2013 | Panchal | H04W 16/14 455/452.1 |
| 2014/0064170 A1* | 3/2014 | Seo | H04L 5/001 370/311 |
| 2014/0112180 A1* | 4/2014 | Axmon | H04W 24/10 370/252 |
| 2014/0126508 A1* | 5/2014 | Young | H04W 4/005 370/329 |
| 2015/0094076 A1 | 4/2015 | Inoue et al. | |
| 2015/0094079 A1* | 4/2015 | Palat | H04W 28/08 455/453 |
| 2016/0080051 A1* | 3/2016 | Sajadieh | H04B 7/0456 375/267 |
| 2016/0261325 A1 | 9/2016 | Ko et al. | |
| 2016/0269093 A1* | 9/2016 | Seol | H04B 7/043 |
| 2016/0352396 A1* | 12/2016 | Seol | H04B 7/0456 |

FOREIGN PATENT DOCUMENTS

| | | |
|---|---|---|
| EP | 2536048 A2 | 12/2012 |
| JP | 2010028737 | 2/2010 |
| KR | 1020040043894 | 5/2004 |
| KR | 10-2013-0017567 | 2/2013 |
| KR | 10-2013-0017572 | 2/2013 |
| KR | 10-2013-0053797 | 5/2013 |
| KR | 1020130053797 | 5/2013 |
| KR | 1020130097117 | 9/2013 |
| KR | 1020130110396 | 10/2013 |
| WO | 2011-161198 | 12/2011 |

OTHER PUBLICATIONS

PCT International Application No. PCT/KR2014/010515, Written Opinion of the International Searching Authority dated Feb. 6, 2015, 20 pages.
PCT International Application No. PCT/KR2014/010519, Written Opinion of the International Searching Authority dated Feb. 6, 2015, 19 pages.
PCT International Application No. PCT/KR2014/010503, Written Opinion of the International Searching Authority dated Jan. 23, 2015, 15 pages.
PCT International Application No. PCT/KR2014/010517, Written Opinion of the International Searching Authority dated Feb. 4, 2015, 20 pages.
European Patent Office Application Serial No. 14858304.0, Search Report dated May 19, 2017, 15 pages.
U.S. Appl. No. 15/032,036, Office Action dated Jun. 1, 2017, 14 pages.
U.S. Appl. No. 15/032,036, Office Action dated Sep. 30, 2016, 23 pages.
PCT International Application No. PCT/KR2014/010516, Written Opinion of the International Searching Authority dated Jan. 22, 2015, 16 pages.
European Patent Office Application Serial No. 14858304.0, Search Report dated Oct. 5, 2017, 13 pages.

* cited by examiner

FIG. 5
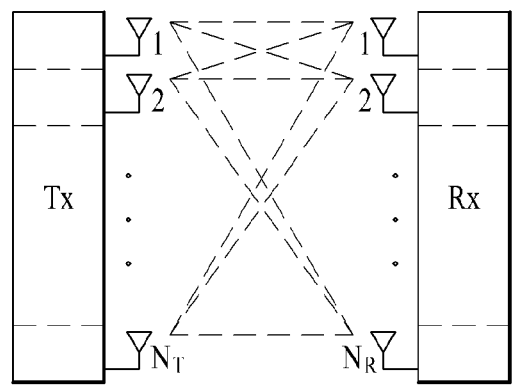
(a)
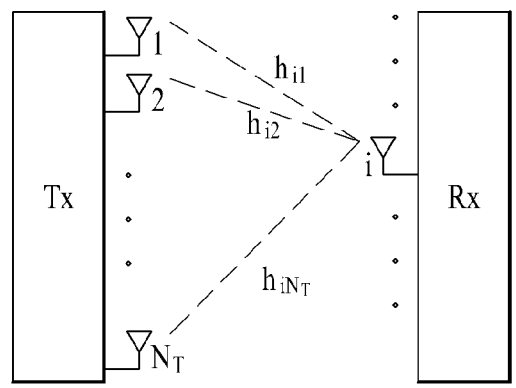
(b)

METHOD AND APPARATUS FOR TRANSMITTING SIGNAL IN WIRELESS COMMUNICATION SYSTEM

CROSS-REFERENCE TO RELATED APPLICATIONS

This application is the National Stage filing under 35 U.S.C. 371 of International Application No. PCT/KR2014/010514, filed on Nov. 4, 2014, which claims the benefit of U.S. Provisional Application No. 61/899,815, filed on Nov. 4, 2013, and 61/909,370, filed on Nov. 26, 2013, the contents of which are all hereby incorporated by reference herein in their entirety.

TECHNICAL FIELD

The present invention relates to a wireless communication system and, more particularly, to a method for transmitting a signal using analog beamforming and digital beamforming in a wireless access system supporting multi user-multiple input and multiple output (MU-MIMO) and an apparatus supporting the same.

BACKGROUND ART

Multiple input multiple output (MIMO) increases the efficiency of data transmission and reception using multiple transmit antennas and multiple receive antennas instead of a single transmission antenna and a single reception antenna. A receiver receives data through multiple paths when multiple antennas are used, whereas the receiver receives data through a single antenna path when a single antenna is used. Accordingly, MIMO can increase a data transmission rate and throughput and improve coverage.

A single cell MIMO scheme can be classified into a single user-MIMO (SU-MIMO) scheme for receiving a downlink signal by a single UE in one cell and a multi user-MIMO (MU-MIMO) scheme for receiving a downlink signal by two or more UEs.

Channel estimation refers to a procedure for compensating for signal distortion due to fading to restore a reception signal. Here, the fading refers to sudden fluctuation in signal intensity due to multipath-time delay in a wireless communication system environment. For channel estimation, a reference signal (RS) known to both a transmitter and a receiver is required. In addition, the RS can be referred to as a RS or a pilot signal according to applied standard.

A downlink RS is a pilot signal for coherent demodulation for a physical downlink shared channel (PDSCH), a physical control format indicator channel (PCFICH), a physical hybrid indicator channel (PHICH), a physical downlink control channel (PDCCH), etc. A downlink RS includes a common RS (CRS) shared by all user equipments (UEs) in a cell and a dedicated RS (DRS) for a specific UE. For a system (e.g., a system having extended antenna configuration LTE-A standard for supporting 8 transmission antennas) compared with a conventional communication system (e.g., a system according to LTE release-8 or 9) for supporting 4 transmission antennas, DRS based data demodulation has been considered for effectively managing RSs and supporting a developed transmission scheme. That is, for supporting data transmission through extended antennas, DRS for two or more layers can be defined. DRS is pre-coded by the same pre-coder as a pre-coder for data and thus a receiver can easily estimate channel information for data demodulation without separate precoding information.

A downlink receiver can acquire pre-coded channel information for extended antenna configuration through DRS but requires a separate RS other than DRS in order to non-precoded channel information. Accordingly, a receiver of a system according to LTE-A standard can define a RS for acquisition of channel state information (CSI), that is, CSI-RS.

DISCLOSURE

Technical Problem

An object of the present invention devised to solve the problem lies in a method and apparatus for transmitting a signal in a wireless communication system based on the discussion above.

Objects of the present invention are not limited to the aforementioned objects, and other objects of the present invention which are not mentioned above will become apparent to those having ordinary skill in the art upon examination of the following description.

Technical Solution

The object of the present invention can be achieved by providing a method for transmitting a signal by a base station in a wireless access system supporting (multi user-multiple input and multiple output (MU-MIMO), the method including generating a beam for a subgroup containing a plurality of user equipments (UEs) using analog beamforming, distinguishing between signals transmitted to the respective UEs belonging to the subgroup using digital beamforming, and transmitting, to the UEs, a signal generated based on the analog beamforming and the digital beamforming, wherein a weight of the analog beamforming may be determined based on channel state information acquired using uplink reference signals.

In another aspect of the present invention, provided herein is a base station for transmitting a signal in a wireless access system supporting multi user-multiple input and multiple output (MU-MIMO), the base station including a radio frequency (RF) unit, and a processor, wherein, the processor is configured to generate a beam for a subgroup containing a plurality of user equipments (UEs) using analog beamforming, distinguish between signals transmitted to the respective UEs belonging to the subgroup using digital beamforming, and transmit, to the UEs, a signal generated based on the analog beamforming and the digital beamforming, wherein a weight of the analog beamforming may be determined based on channel state information acquired using uplink reference signals.

Embodiments according to the above aspects of the present invention may include the following details in common.

A transmission period of the uplink reference signals may be determined by adding a guard time to a time obtained by dividing a data symbol period.

The uplink reference signals may be generated by increasing subcarrier spacing while maintaining a sampling frequency of a data symbol.

The uplink reference signals transmitted consecutively may be partially overlapped each other in a time domain.

The uplink reference signals may be transmitted at a time different from a time to transmit another control signal or a data signal.

The method may further include transmitting transmission period information about the uplink reference signals to the UEs.

The uplink reference signals may be based on a sequence having similar correlation property in a frequency domain and time domain.

It will be appreciated by persons skilled in the art that that the effects that could be achieved with the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 is a schematic diagram illustrating a wireless communication system having multiple antennas;

BEST MODE

Figure 1:
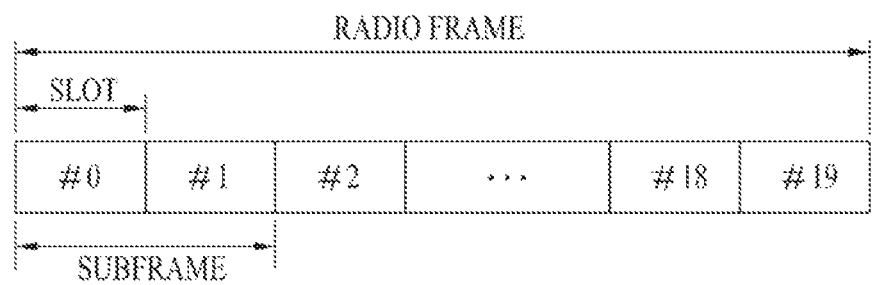
FIG. 1 is a diagram illustrating an example of a structure of a downlink radio frame.

The embodiments described below correspond to predetermined combinations of elements and features and characteristics of the present invention. Moreover, unless mentioned otherwise, the characteristics of the present invention may be considered as optional features of the present invention. Herein, each element or characteristic of the present invention may also be operated or performed without being combined with other elements or characteristics of the present invention. Alternatively, the embodiment of the present invention may be realized by combining some of the elements and/or characteristics of the present invention. Additionally, the order of operations described according to the embodiment of the present invention may be varied. Furthermore, part of the configuration or characteristics of any one specific embodiment of the present invention may also be included in (or shared by) another embodiment of the present invention, or part of the configuration or characteristics of any one embodiment of the present invention may replace the respective configuration or characteristics of another embodiment of the present invention.

In the description of the present invention, the embodiments of the present invention will be described by mainly focusing on the data transmission and reception relation between a base station and a user equipment. Herein, the base station may refer to a terminal node of the network that performs direct communication with the user equipment (or user terminal). In the description of the present invention, particular operations of the present invention that are described as being performed by the base station may also be performed by an upper node of the base station.

More specifically, in a network consisting of multiple network nodes including the base station, diverse operations that are performed in order to communicate with the terminal (or user equipment) may be performed by the base station or network nodes other than the base station. Herein, the term 'Base Station (BS)' may be replaced by other terms, such as fixed station, Node B, eNode B (eNB), ABS (Advanced Base Station), or Access Point (AP). Relay may be replaced by other terms, such as Relay Node (RN), Relay Station (RS), and so on. Furthermore, 'Terminal' may be replaced by other terms, such as UE (User Equipment), MS (Mobile Station), MSS (Mobile Subscriber Station), SS (Subscriber Station), and so on.

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and important functions of the structures and devices are shown in block diagram form. The same reference numbers will be used throughout the drawings to refer to the same or like parts.

Exemplary embodiments of the present invention are supported by standard documents disclosed for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. In particular, steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, code division multiple access (CDMA), frequency division multiple access (FDMA), time division multiple access (TDMA), orthogonal frequency division multiple access (OFDMA), single carrier frequency division multiple access (SC-FDMA), and the like. CDMA may be embodied through wireless (or radio) technology such as universal terrestrial radio access (UTRA) or CDMA2000. TDMA may be embodied through wireless (or radio) technology such as global system for mobile communication (GSM)/general packet radio service (GPRS)/enhanced data rates for GSM evolution (EDGE). OFDMA may be embodied through wireless (or radio) technology such as institute of electrical and electronics engineers (IEEE) 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE. WiMAX can be explained by IEEE 802.16e (wirelessMAN-OFDMA reference system) and advanced IEEE 802.16m (wirelessMAN-OFDMA advanced system). For clarity, the following description focuses on IEEE 802.11 systems. However, technical features of the present invention are not limited thereto.

With reference to FIG. 1, the structure of a downlink radio frame will be described below.

In a cellular orthogonal frequency division multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to frequency division duplex (FDD) and a type-2 radio frame structure applicable to time division duplex (TDD).

FIG. 1 illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a cyclic prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease inter-symbol interference (ISI).

In the case of the normal CP, one subframe includes 14 OFDM symbols because one slot includes 7 OFDM symbols. The first two or three OFDM symbols of each subframe may be allocated to a physical downlink control channel (PDCCH) and the other OFDM symbols may be allocated to a physical downlink shared channel (PDSCH).

The above-described radio frame structures are purely exemplary and thus it is to be noted that the number of subframes in a radio frame, the number of slots in a subframe, or the number of symbols in a slot may vary.

Figure 2:
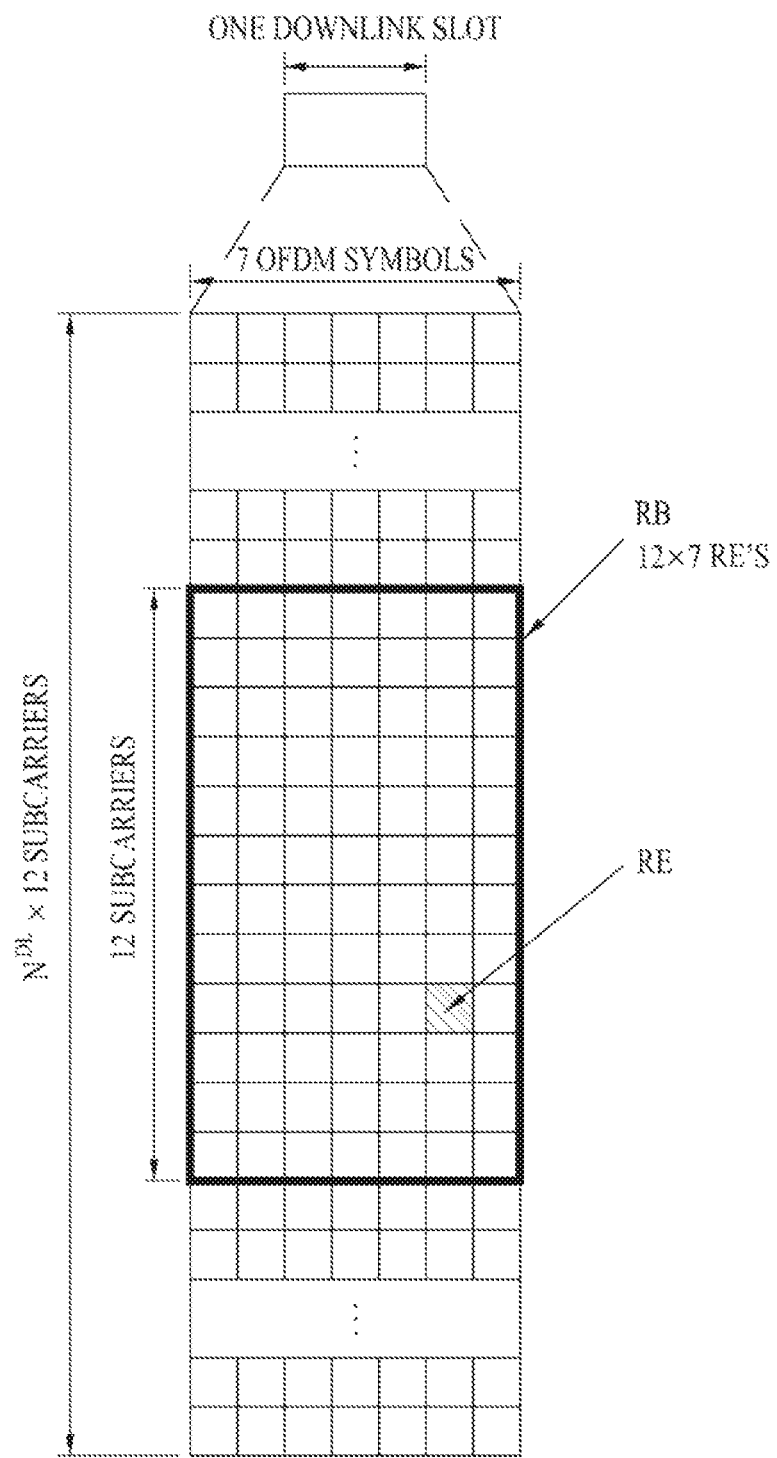
FIG. 2 is a diagram illustrating an example of a resource grid for one downlink slot.

FIG. 2 illustrates the structure of a downlink resource grid for the duration of one downlink slot. FIG. 2 corresponds to a case in which an OFDM includes normal CP. Referring to FIG. 2, a downlink slot includes a plurality of OFDM symbols in the time domain and includes a plurality of RBs in the frequency domain. Here, one downlink slot includes 7 OFDM symbols in the time domain and an RB includes 12 subcarriers in the frequency domain, which does not limit the scope and spirit of the present invention. An element on a resource grid is referred to as a resource element (RE). For example, RE a(k,l) refers to RE location in a kth subcarrier and a first OFDM symbol. In the case of the normal CP, one RB includes 12×7 REs (in the case of the extended CP, one RB includes 12×6 REs). An interval between subcarriers is 15 kHz and thus one RB includes about 180 kHz in the frequency domain. NDL is number of RBs in a downlink slot. NDL depends on a downlink transmission bandwidth configured by BS scheduling.

Figure 3:
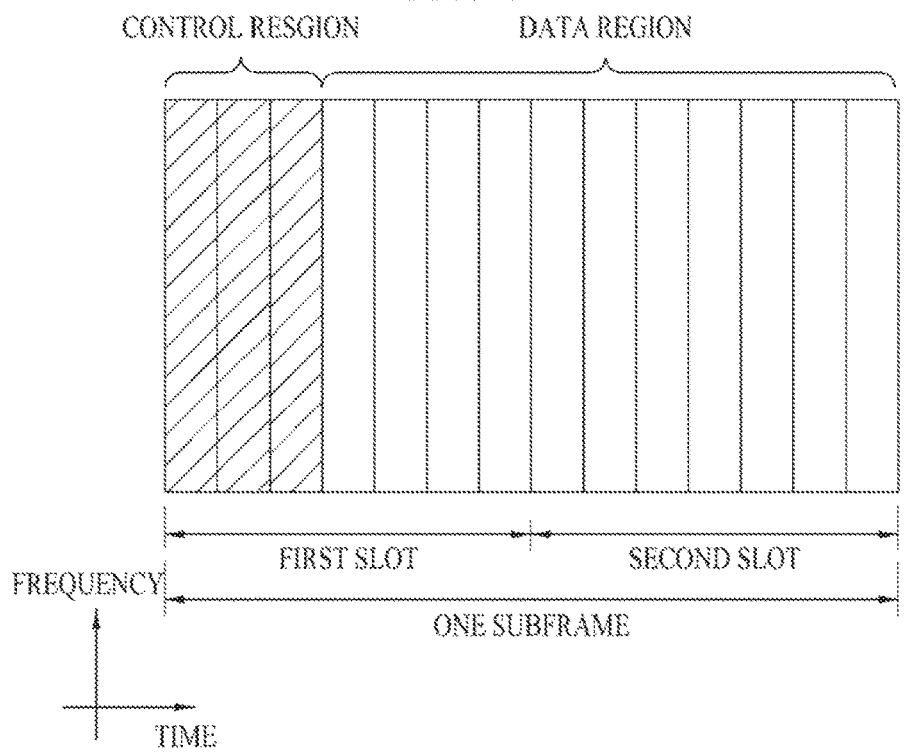
FIG. 3 is a diagram illustrating a structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. A basic unit of transmission is one subframe. That is, a PDCCH and a PDSCH are allocated across two slots. Downlink control channels used in the 3GPP LTE system include, for example, a physical control format indicator channel (PCFICH), a physical downlink control channel (PDCCH), and a physical hybrid automatic repeat request (HARQ) indicator channel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called downlink control information (DCI). The DCI transports uplink or downlink scheduling information, or uplink transmission power control commands for UE groups. The PDCCH delivers information about resource allocation and a transport format for a downlink shared channel (DL-SCH), resource allocation information about an uplink shared channel (UL-SCH), paging information of a paging channel (PCH), system information on the DL-SCH, information about resource allocation for a higher-layer control message such as a random access response transmitted on the PDSCH, a set of transmission power control commands for individual UEs of a UE group, transmission power control information, voice over Internet protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE corresponds to a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a cyclic redundancy check (CRC) to control information. The CRC is masked by an identifier (ID) known as a radio network temporary identifier (RNTI) according to the owner or usage of the PDCCH. When the PDCCH is directed to a specific UE, its CRC may be masked by a cell-RNTI (C-RNTI) of the UE. When the PDCCH is for a paging message, the CRC of the PDCCH may be masked by a paging indicator identifier (P-RNTI). When the PDCCH carries system information, particularly, a system information block (SIB), its CRC may be masked by a system information ID and a system information RNTI (SI-RNTI). To indicate that the PDCCH carries a random access response in response to a random access preamble transmitted by a UE, its CRC may be masked by a random access-RNTI (RA-RNTI).

Figure 4:
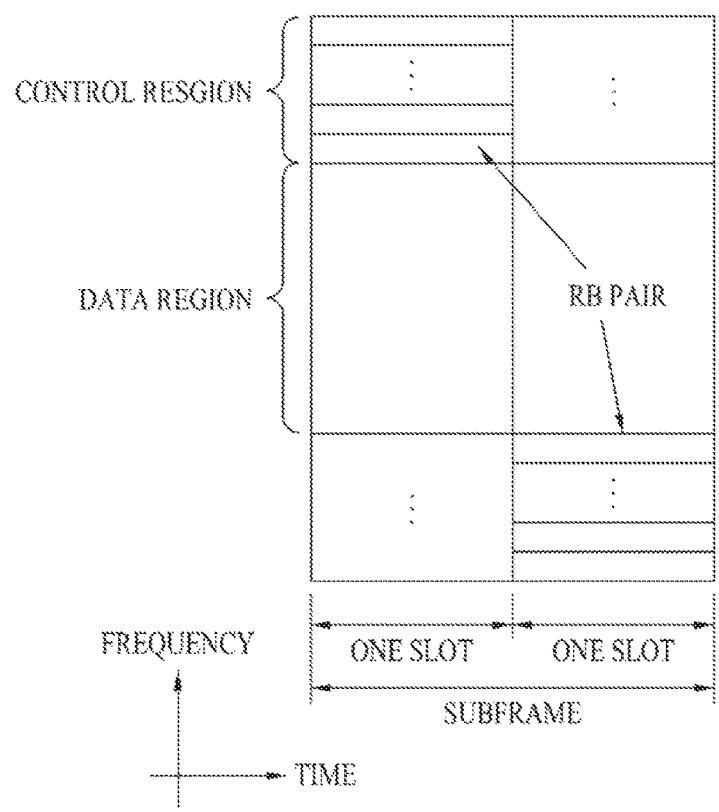
FIG. 4 is a diagram illustrating a structure of an uplink subframe.

FIG. 4 illustrates the structure of an uplink subframe. An uplink subframe may be divided into a control region and a data region in the frequency domain. A Physical Uplink Control Channel (PUCCH) carrying uplink control information is allocated to the control region and a physical uplink shared channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Modeling of MIMO System

A multiple input multiple output (MIMO) system increases transmission/reception efficiency of data using multiple transmission (Tx) antennas and multiple reception (Rx) antennas. MIMO technology does not depend upon a single antenna path in order to receive all messages but instead can combine a plurality of data fragments received through a plurality of antennas and receive all data.

MIMO technology includes a spatial diversity scheme, a spatial multiplexing scheme, etc. The spatial diversity scheme can increase transmission reliability or can widen a cell diameter with diversity gain and thus is appropriate for data transmission of a UE that moves a high speed. The spatial multiplexing scheme can simultaneously transmit different data so as to increase data transmission rate without increase in a system bandwidth.

FIG. 5 illustrates the configuration of a MIMO communication system having multiple antennas. As illustrated in FIG. 5(a), the simultaneous use of a plurality of antennas at both the transmitter and the receiver increases a theoretical channel transmission capacity, compared to use of a plurality of antennas at only one of the transmitter and the receiver. Therefore, transmission rate may be increased and frequency efficiency may be remarkably increased. As channel transmission rate is increased, transmission rate may be increased, in theory, to the product of a maximum transmission rate Ro that may be achieved with a single antenna and a transmission rate increase Ri.

$$R_i = \min(N_T, N_R) \quad \text{[Equation 1]}$$

For instance, a MIMO communication system with four Tx antennas and four Rx antennas may achieve a four-fold increase in transmission rate theoretically, relative to a single-antenna system. Since the theoretical capacity increase of the MIMO system was verified in the middle 1990s, many techniques have been actively proposed to increase data rate in real implementation. Some of the techniques have already been reflected in various wireless communication standards for 3G mobile communications, future-generation wireless local area network (WLAN), etc.

Concerning the research trend of MIMO up to now, active studies are underway in many respects of MIMO, inclusive of studies of information theory related to calculation of multi-antenna communication capacity in diverse channel environments and multiple access environments, studies of measuring MIMO radio channels and MIMO modeling, studies of time-space signal processing techniques to increase transmission reliability and transmission rate, etc.

Communication in a MIMO system will be described in detail through mathematical modeling. It is assumed that NT Tx antennas and NR Rx antennas are present in the system.

Regarding a transmission signal, up to NT pieces of information can be transmitted through the NT Tx antennas, as expressed in Equation 2 below.

$$s = [s_1, s_2, \ldots, s_{N_T}]^T \quad \text{[Equation 2]}$$

A different transmission power may be applied to each piece of transmission information, $s_1, s_2, \ldots, s_{N_T}$. Let the transmission power levels of the transmission information be denoted by $P_1, P_2, \ldots, P_{N_T}$, respectively. Then the transmission power-controlled transmission information vector is given as $$\hat{s}[\hat{s}_1, \hat{s}_2, \ldots \hat{s}_{N_T}]^T = [P_1 s_1, P_2 s_2, \ldots, P_{N_T} s_{N_T}]^T \quad \text{[Equation 3]}$$

The transmission power-controlled transmission information vector ŝ may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

NT transmission signals $x_1, x_2, \ldots, x_{N_T}$ may be generated by multiplying the transmission power-controlled information vector ŝ by a weight matrix W. The weight matrix W functions to appropriately distribute the transmission information to the Tx antennas according to transmission channel states, etc. These NT transmission signals $x_1, x_2, \ldots, x_{N_T}$ are represented as a vector x, which may be determined by Equation 5 below.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & & \ddots & \vdots \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

Here, $w_{ij}$ refers to a weight between an ith Tx antenna and jth information.

A reception signal x may be considered in different ways according to two cases (e.g., spatial diversity and spatial multiplexing). In the case of spatial multiplexing, different signals are multiplexed and the multiplexed signals are transmitted to a receiver, and thus elements of information vector (s) have different values. In the case of spatial diversity, the same signal is repeatedly transmitted through a plurality of channel paths and thus elements of information vectors (s) have the same value. A hybrid scheme of spatial multiplexing and spatial diversity can also be considered. That is, that same signal may be transmitted through three Tx antennas and the remaining signals may be spatial-multiplexed and transmitted to a receiver.

In the case of NR Rx antennas, a reception signal of each antenna may be expressed as the vector shown in Equation 6 below.

$$y = [y_1, y_2, \ldots, y_{N_R}]^T \quad \text{[Equation 6]}$$

When a channel modeling is executed in the MIMO communication system, individual channels can be distinguished from each other according to transmission/reception (Tx/Rx) antenna indexes. A channel passing the range from a Tx antenna j to an Rx antenna i is denoted by hij. It should be noted that the index order of the channel hij is located before a reception (Rx) antenna index and is located after a transmission (Tx) antenna index.

FIG. 5(b) illustrates channels from NT Tx antennas to an Rx antenna i. The channels may be collectively represented in the form of vector and matrix. Referring to FIG. 5(b), the channels passing the range from the NT Tx antennas to the Rx antenna i can be represented by the Equation 7 below.

$$h_i^T = [h_{i1}, h_{i2}, \ldots, h_{iN_T}] \quad \text{[Equation 7]}$$

All channels passing the range from the NT Tx antennas to NR Rx antennas are denoted by the matrix shown in Equation 8 below.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R1} & h_{N_R2} & \cdots & h_{N_RN_T} \end{bmatrix} \quad \text{[Equation 8]}$$

Additive white Gaussian noise (AWGN) is added to an actual channel which has passed the channel matrix. The AWGN (n1, n2, . . . , nNR) added to each of NR reception (Rx) antennas can be represented by Equation 9 below.

$$n = [n_1, n_2, \ldots, n_{N_R}]^T \quad \text{[Equation 9]}$$

A reception signal calculated by the above-mentioned equations can be represented by Equation 10 below.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx + n$$

The number of rows and the number of columns of a channel matrix H indicating a channel condition are determined by the number of Tx/Rx antennas. In the channel matrix H, the number of rows is equal to the number (NR) of Rx antennas, and the number of columns is equal to the number (NT) of Tx antennas. Namely, the channel matrix H is denoted by an NR×NT matrix.

The rank of a matrix is defined as the smaller between the number of independent rows and the number of independent columns in the channel matrix. Accordingly, the rank of the channel matrix is not larger than the number of rows or columns of the channel matrix. The rank of a channel matrix H, rank(H) satisfies the following constraint.

$$\text{rank}(H) \leq \min(N_T, N_R) \quad \text{[Equation 11]}$$

For MIMO transmission, 'rank' indicates the number of paths for independent transmission of signals and 'number of layers' indicates the number of streams transmitted through each path. In general, a transmission end transmits layers, the number of which corresponds to the number of ranks used for signal transmission, and thus, rank have the same meaning as number of layers unless there is no different disclosure.

Reference Signals (RSs)

In a wireless communication system, a packet is transmitted on a radio channel. In view of the nature of the radio channel, the packet may be distorted during the transmission. To receive the signal successfully, a receiver should compensate for the distortion of the reception signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs in a mobile communication system may be divided into two types according to their purposes: RS for channel information acquisition and RS for data demodulation. Since its purpose lies in that a UE acquires downlink channel information, the former should be transmitted in a broad band and received and measured even by a UE that does not receive downlink data in a specific subframe. This RS is also used in a situation like handover. The latter is an RS that an eNB transmits along with downlink data in specific resources. A UE can estimate a channel by receiving the RS and accordingly can demodulate data. The RS should be transmitted in a data transmission area.

A legacy 3GPP LTE (e.g., 3GPP LTE release-8) system defines two types of downlink RSs for unicast services: a common RS (CRS) and a dedicated RS (DRS). The CRS is used for acquisition of information about a channel state, measurement of handover, etc. and may be referred to as a cell-specific RS. The DRS is used for data demodulation and may be referred to as a UE-specific RS. In a legacy 3GPP LTE system, the DRS is used for data demodulation only and the CRS can be used for both purposes of channel information acquisition and data demodulation.

CRSs, which are cell-specific, are transmitted across a wideband in every subframe. According to the number of Tx antennas at an eNB, the eNB may transmit CRSs for up to four antenna ports. For instance, an eNB with two Tx antennas transmits CRSs for antenna port 0 and antenna port 1. If the eNB has four Tx antennas, it transmits CRSs for respective four Tx antenna ports, antenna port 0 to antenna port 3.

Figure 6:
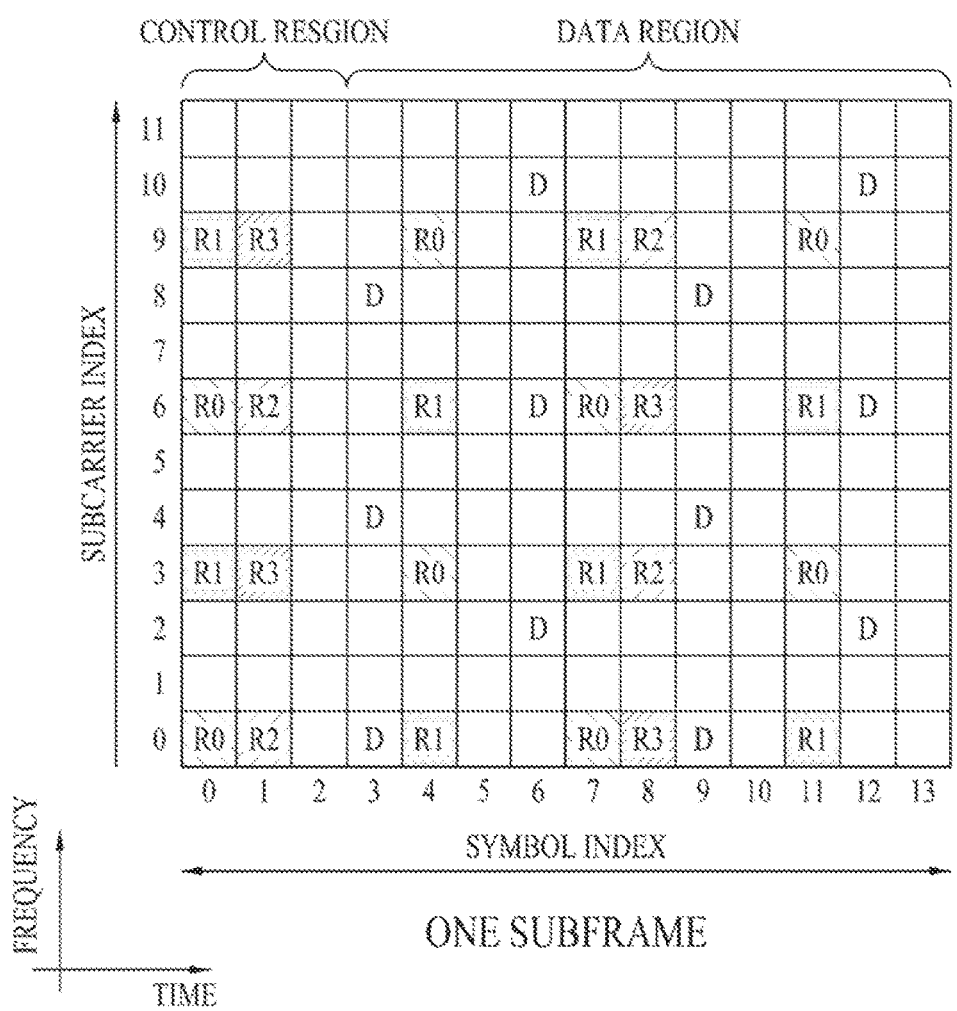
FIG. 6 is a diagram illustrating legacy CRS and DRS patterns.

FIG. 6 illustrates a CRS and DRS pattern for an RB (including 14 OFDM symbols in time by 12 subcarriers in frequency in case of a normal CP) in a system where an eNB has four Tx antennas. In FIG. 6, REs labeled with 'R0', 'R1', 'R2' and 'R3' represent the positions of CRSs for antenna port 0 to antenna port 4, respectively. REs labeled with 'D' represent the positions of DRSs defined in the LTE system.

The LTE-A system, an evolution of the LTE system, can support up to eight Tx antennas. Therefore, it should also support RSs for up to eight Tx antennas. Because downlink RSs are defined only for up to four Tx antennas in the LTE system, RSs should be additionally defined for five to eight Tx antenna ports, when an eNB has five to eight downlink Tx antennas in the LTE-A system. Both RSs for channel measurement and RSs for data demodulation should be considered for up to eight Tx antenna ports.

One of significant considerations for design of the LTE-A system is backward compatibility. Backward compatibility is a feature that guarantees a legacy LTE terminal to operate normally even in the LTE-A system. If RSs for up to eight Tx antenna ports are added to a time-frequency area in which CRSs defined by the LTE standard are transmitted across a total frequency band in every subframe, RS overhead becomes huge. Therefore, new RSs should be designed for up to eight antenna ports in such a manner that RS overhead is reduced.

Largely, new two types of RSs are introduced to the LTE-A system. One type is CSI-RS serving the purpose of channel measurement for selection of a transmission rank, a modulation and coding scheme (MCS), a precoding matrix index (PMI), etc. The other type is demodulation RS (DM RS) for demodulation of data transmitted through up to eight Tx antennas.

Compared to the CRS used for both purposes of measurement such as channel measurement and measurement for handover and data demodulation in the legacy LTE system, the CSI-RS is designed mainly for channel estimation, although it may also be used for measurement for handover. Since CSI-RSs are transmitted only for the purpose of acquisition of channel information, they may not be transmitted in every subframe, unlike CRSs in the legacy LTE system. Accordingly, CSI-RSs may be configured so as to be transmitted intermittently (e.g. periodically) along the time axis, for reduction of CSI-RS overhead.

When data is transmitted in a downlink subframe, DM RSs are also transmitted dedicatedly to a UE for which the data transmission is scheduled. Thus, DM RSs dedicated to a particular UE may be designed such that they are transmitted only in a resource area scheduled for the particular UE, that is, only in a time-frequency area carrying data for the particular UE.

Figure 7:
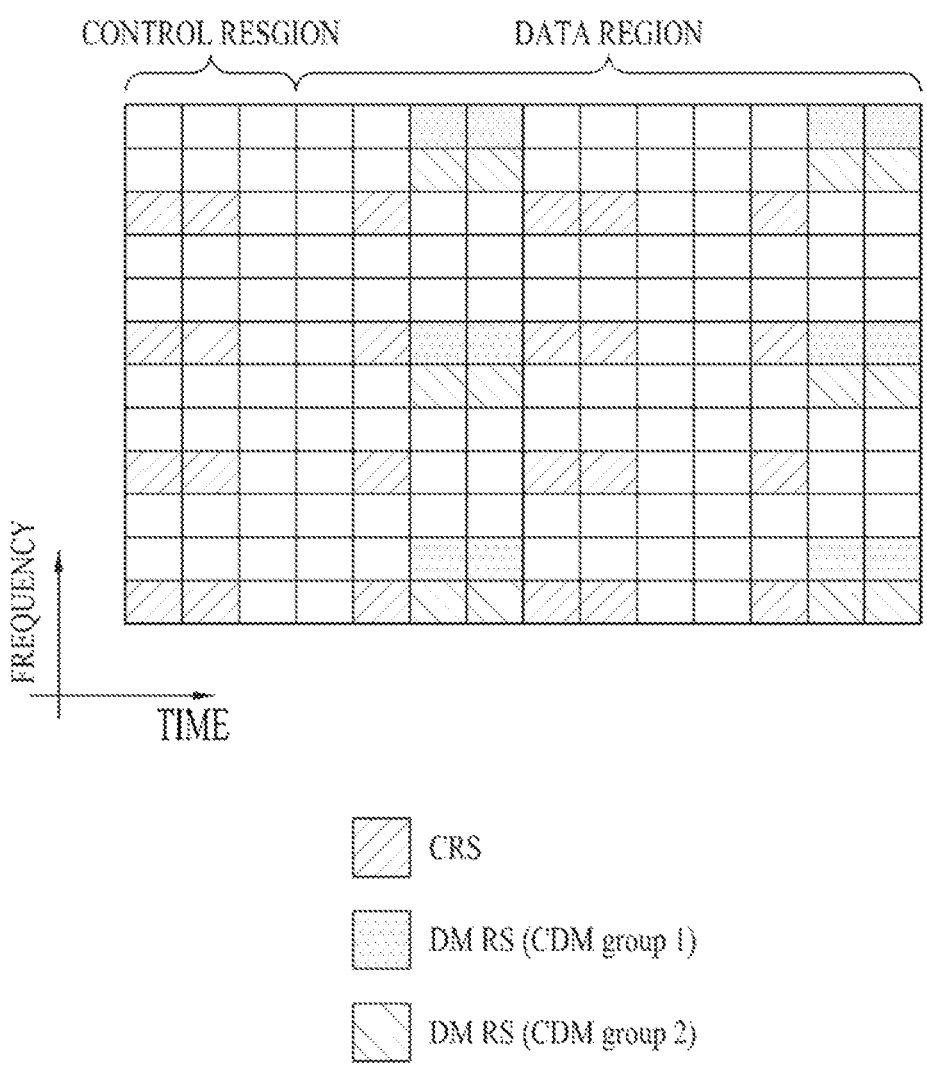
FIG. 7 is a diagram illustrating an example of a DM RS pattern.

FIG. 7 illustrates an exemplary DM RS pattern defined for the LTE-A system. In FIG. 7, the positions of REs carrying DM RSs in an RB carrying downlink data (an RB having 14 OFDM symbols in time by 12 subcarriers in frequency in case of a normal CP) are marked. DM RSs may be transmitted for additionally defined four antenna ports, antenna port 7 to antenna port 10 in the LTE-A system. DM RSs for different antenna ports may be identified by their different frequency resources (subcarriers) and/or different time resources (OFDM symbols). This means that the DM RSs may be multiplexed in frequency division multiplexing (FDM) and/or time division multiplexing (TDM). If DM RSs for different antenna ports are positioned in the same time-frequency resources, they may be identified by their different orthogonal codes. That is, these DM RSs may be multiplexed in Code Division Multiplexing (CDM). In the illustrated case of FIG. 7, DM RSs for antenna port 7 and antenna port 8 may be located on REs of DM RS CDM group 1 through multiplexing based on orthogonal codes. Similarly, DM RSs for antenna port 9 and antenna port 10 may be located on REs of DM RS CDM group 2 through multiplexing based on orthogonal codes.

Figure 8:
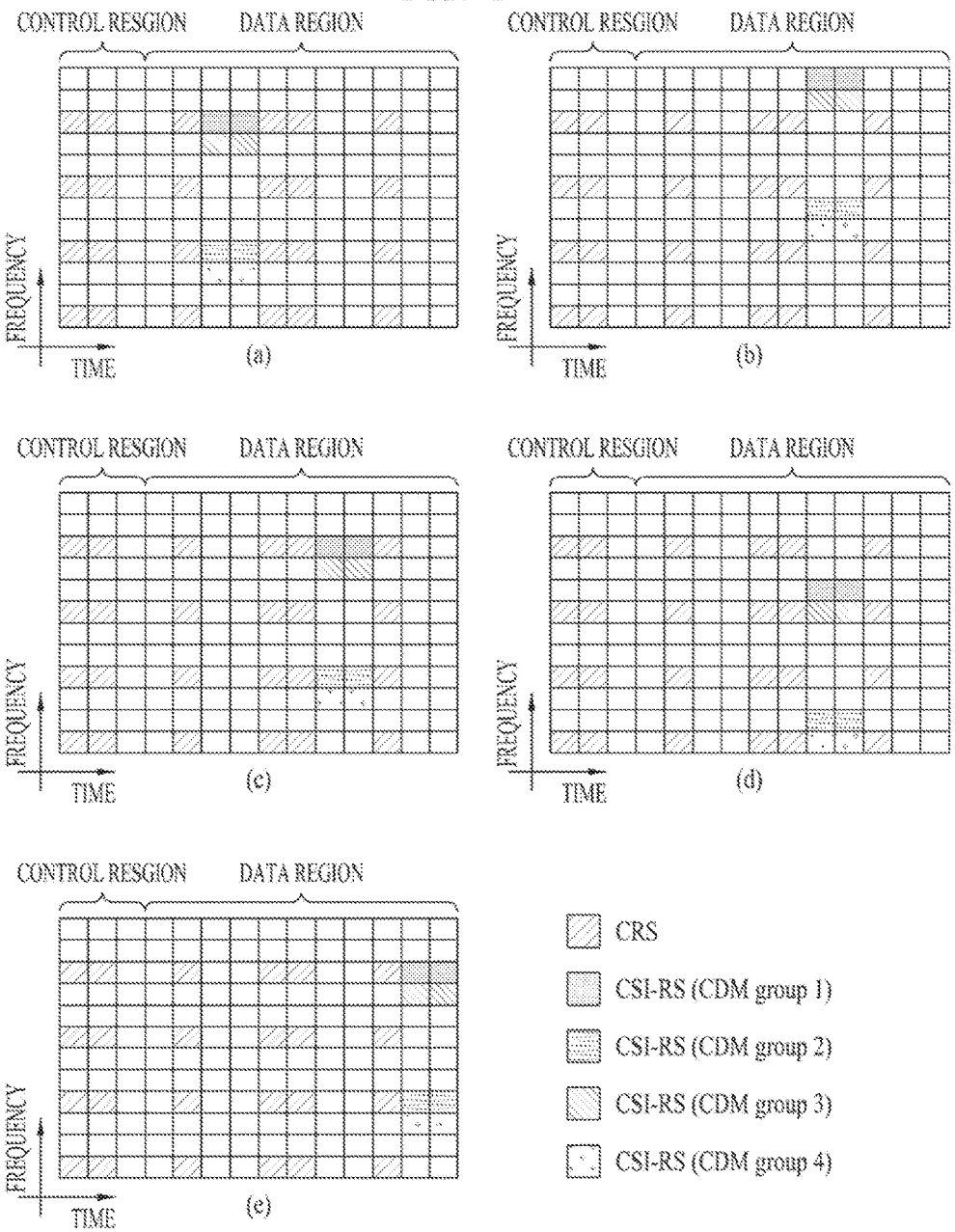
FIG. 8 is a diagram illustrating examples of a CSI-RS pattern.

FIG. 8 illustrates exemplary CSI-RS patterns defined for the LTE-A system. In FIG. 8, the positions of REs carrying CSI-RSs in an RB carrying downlink data (an RB having 14 OFDM symbols in time by 12 subcarriers in frequency in case of a normal CP) are marked. One of the CSI-RS patterns illustrated in FIGS. 8(a) to 8(e) is available for any downlink subframe. CSI-RSs may be transmitted for eight antenna ports supported by the LTE-A system, antenna port 15 to antenna port 22. CSI-RSs for different antenna ports may be identified by their different frequency resources (subcarriers) and/or different time resources (OFDM symbols). This means that the CSI-RSs may be multiplexed in FDM and/or TDM. CSI-RSs positioned in the same time-frequency resources for different antenna ports may be identified by their different orthogonal codes. That is, these DM RSs may be multiplexed in CDM. In the illustrated case of FIG. 8(a), CSI-RSs for antenna port 15 and antenna port 16 may be located on REs of CSI-RS CDM group 1 through multiplexing based on orthogonal codes. CSI-RSs for antenna port 17 and antenna port 18 may be located on REs of CSI-RS CDM group 2 through multiplexing based on orthogonal codes. CSI-RSs for antenna port 19 and antenna port 20 may be located on REs of CSI-RS CDM group 3 through multiplexing based on orthogonal codes. CSI-RSs for antenna port 21 and antenna port 22 may be located on REs of CSI-RS CDM group 4 through multiplexing based on orthogonal codes. The same principle described with reference to FIG. 8(a) is applicable to the CSI-RS patterns illustrated in FIGS. 8(b) to 8(e).

The RS patterns of FIGS. 6 to 8 are only exemplary, and application of various embodiments of the present invention is not limited to a specific RS pattern. That is, various embodiments of the present invention may equally be applied to even a case where RS patterns different from those of FIGS. 6 to 8 are defined and used.

CSI-RS Configuration

Among the plurality of CSI-RSs and the plurality of IMRs, which are configured for the UE, one CSI process may be defined by associating one CSI-RS resource for signal measurement with one interference measurement resource (IMR) for interference measurement. The UE feeds back CSI information derived from different CSI processes to the network (for example, base station) by using an independent period and subframe offset.

In other words, each CSI process has independent CSI feedback configuration. Association information on the CSI-RS resource and the IMR resource and CSI feedback configuration may be notified from the base station to the UE through higher layer signaling such as RRC per CSI process. For example, it is assumed that three CSI processes are configured for the UE as illustrated in Table 1.

TABLE 1

| CSI Process | Signal Measurement Resource (SMR) | IMR |
|---|---|---|
| CSI process 0 | CSI-RS 0 | IMR 0 |
| CSI process 1 | CSI-RS 1 | IMR 1 |
| CSI process 2 | CSI-RS 0 | IMR 2 |

In Table 1, CSI-RS 0 and CSI-RS 1 respectively represent CSI-RS received from a cell 1 which is a serving cell of the UE and CSI-RS received from a cell 2 which is a neighboring cell which joins cooperation. It is assumed that IMR configured for each CSI process of Table 1 is configured as illustrated in Table 2.

TABLE 2

| IMR | eNB 1 | eNB 2 |
|---|---|---|
| IMR 0 | Muting | Data transmission |
| IMR 1 | Data transmission | Muting |
| IMR 2 | Muting | Muting |

In IMR 0, the cell 1 performs muting, the cell 2 performs data transmission, and the UE is configured to measure interference from the other cells except the cell 1. Likewise, in IMR 1, the cell 2 performs muting, the cell performs data transmission, and the UE is configured to measure interference from the other cells the cell 2. Also, in IMR 2, both the cell 1 and the cell 2 perform muting, and the UE is configured to measure interference from the other cells except the cell 1 and the cell 2.

Accordingly, as illustrated in Table 1 and Table 2, CSI information of the CSI process 0 represents optimized RI, PMI and CQI information if data are received from the cell 1. CSI information of the CSI process 1 represents optimized RI, PMI and CQI information if data are received from the cell 2. CSI information of the CSI process 2 represents optimized RI, PMI and CQI information if data are received from the cell 1 and if there is no interference from the cell 2.

It is preferable that a plurality of CSI processes configured for one UE share dependent values. For example, in case of joint transmission (JP) of the cell 1 and the cell 2, if a CSI process 1 which regards a channel of the cell 1 as a signal part and a CSI process 2 which regards a channel of the cell 2 as a signal part are configured for one UE, the CSI process 1 and the CSI process 2 need to have the same rank and subband indexes in order to easily perform JT scheduling.

A period or pattern for transmission of the CSI-RS may be configured by the base station. In order to measure the CSI-RS, the UE should know CSI-RS configuration for each CSI-RS antenna port of a cell to which the UE belongs. The CSI-RS configuration may include a downlink subframe index to which the CSI-RS is transmitted, time-frequency location (for example, CSI-RS pattern as shown in FIGS. 8(a) to 8(e)) of a CSI-RS resource element (RE) within a transmission subframe, and a CSI-RS sequence (sequence used for CSI-RS and generated pseudo-randomly in accordance with a predetermined rule on the basis of a slot number, cell ID, a CP length, etc.). That is, a plurality of CSI-RS configurations may be used by a given base station, and the base station may notify UEs within a cell of a CSI-RS configuration, which will be used for the UEs, among a plurality of CSI-RS configurations.

Also, since the CSI-RS for each antenna port is needed to be identified from another one, resources to which the CSI-RS for each antenna port is transmitted should be orthogonal to one another. As described with reference to FIG. 8, the CSI-RSs for each antenna port may be multiplexed in accordance with an FDM mode, a TDM mode and/or a CDM mode by using orthogonal frequency resources, orthogonal time resources and/or orthogonal code resources.

When the base station reports information (CSI-RS configuration) on CSI-RS to UEs within a cell, the base station should first notify the UEs of information on time-frequency into which the CSI-RS for each antenna port is mapped. In more detail, the information on time may include subframe numbers to which the CSI-RS is transmitted, a transmission period of the CSI-RS, subframe offset for transmission of the CSI-RS, and OFDM symbol number to which a CSI-RS resource element (RE) of a specific antenna is transmitted. The information on frequency may include a frequency spacing to which the CSI-RS resource element (RE) of a specific antenna is transmitted, offset or shift value of RE on a frequency axis, etc.

Figure 9:
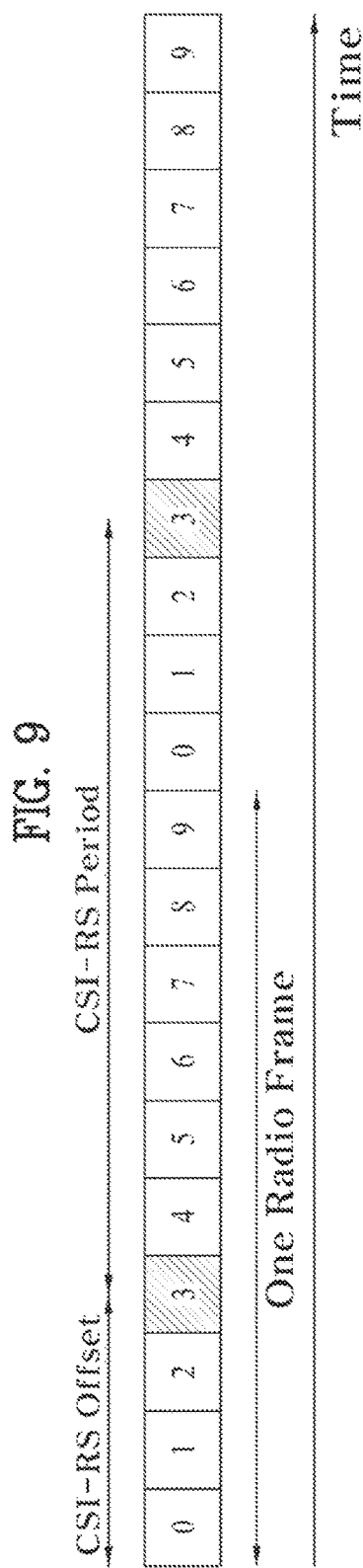
FIG. 9 is a diagram illustrating an example of a method for periodically transmitting a CSI-RS.

FIG. 9 is a diagram illustrating an example of periodically transmitting a CSI-RS. The CSI-RS may be transmitted periodically with a period (for example, a period of 5 subframes, a period of 10 subframes, a period of 20 subframes, a period of 40 subframes, or a period of 80 subframes) of an integer multiple of one subframe.

In FIG. 9, one radio frame includes 10 subframes (subframe numbers 0 to 9). For example, in FIG. 9, a transmission period of the CSI-RS of the base station is 10 ms (that is, 10 subframes), and CSI-RS transmission offset is 3. Each offset value may be varied for each base station, whereby CSI-RSs of various cells may uniformly be distributed on the time. If the CSI-RS is transmitted with a period of 10 ms, the offset value may have one of 0 to 9. Similarly, if the CSI-RS is transmitted with a period of 5 ms, the offset value may have one of 0 to 4, if the CSI-RS is transmitted with a period of 20 ms, the offset value may have one of 0 to 19, if the CSI-RS is transmitted with a period of 40 ms, the offset value may have one of 0 to 39, and if the CSI-RS is transmitted with a period of 80 ms, the offset value may have one of 0 to 79. This offset value represents a value of a subframe at which the base station starts CSI-RS transmission with a predetermined period. If the base station notifies the UE of a transmission period and offset value of the CSI-RS, the UE may receive the CSI-RS of the base station at the location of the corresponding subframe by using the notified value. The UE measures a channel through the received CSI-RS, and as a result, may report information such as CQI, PMI and/or RI (Rank Indicator) to the base station. Herein, CQI, PMI and RI may collectively be referred to as CQI (or CSI) except that CQI, PMI and RI are described separately. Also, the transmission period and offset of the CSI-RS may separately be designated per CSI-RS configuration.

Figure 10:
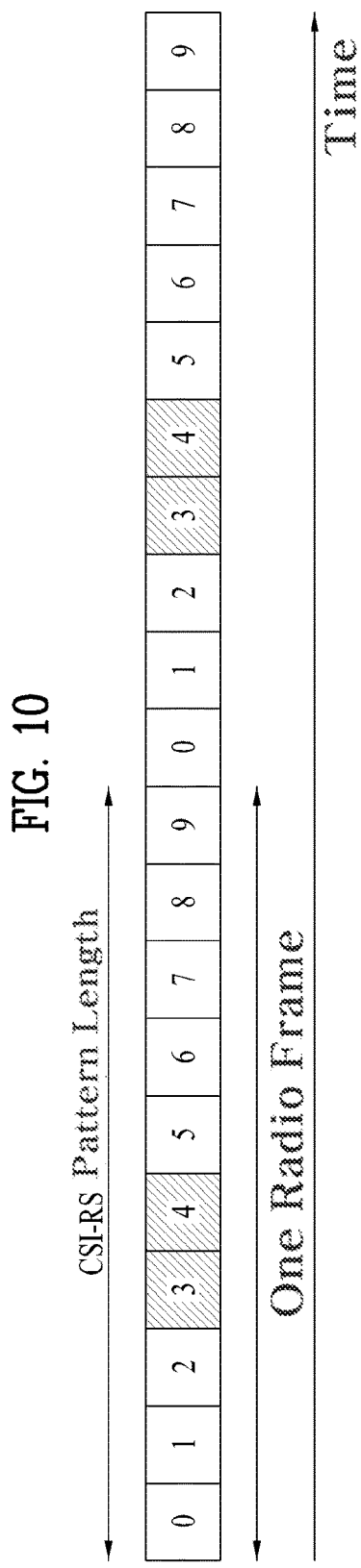
FIG. 10 is a diagram illustrating an example of a method for non-periodically transmitting a CSI-RS.

FIG. 10 is a diagram illustrating an example of non-periodically transmitting a CSI-RS. In FIG. 10, one radio frame includes 10 subframes (subframe numbers 0 to 9). A subframe to which the CSI-RS is transmitted may be represented by a specific pattern as shown in FIG. 10. For example, a CSI-RS transmission pattern may be configured in a unit of 10 subframes, and CSI-RS transmission at each subframe may be designated by a 1-bit indicator. A CSI-RS pattern transmitted at subframe indexes 3 and 4 within 10 subframes (subframe indexes 0 to 9) is shown in the example of FIG. 10. The indicator may be provided to the UE through higher layer signaling.

Various configurations for CSI-RS transmission may be configured as described above. In order that the UE performs channel measurement by normally receiving the CSI-RS, the base station needs to notify the UE of CSI-RS configuration. Embodiments of the present invention related to notification of CSI-RS configuration to the UE will be described hereinafter.

Configuration of RF Terminals

Figure 11:
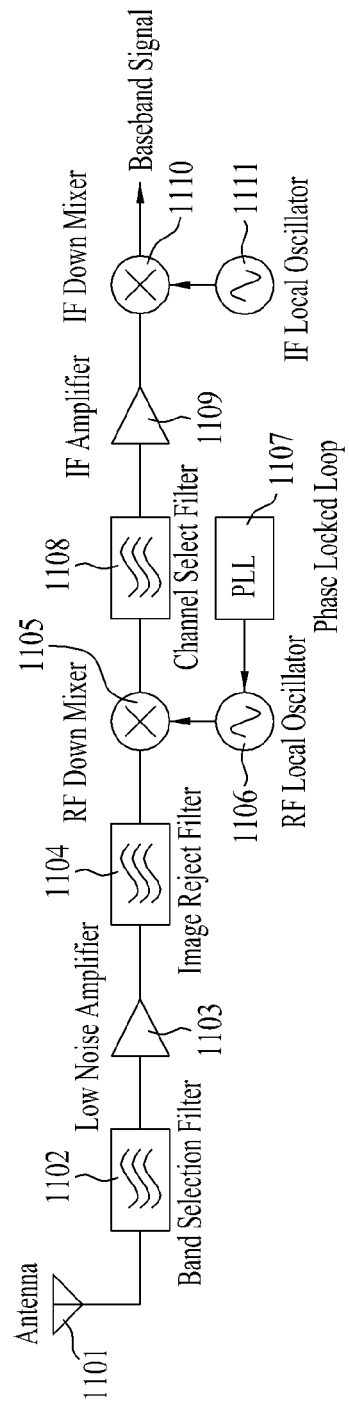
FIG. 11 illustrates an exemplary RF receiver employed in a wireless access system.

FIG. 11 illustrates an exemplary RF receiver employed in a wireless access system.

Referring to FIG. 11, an antenna 1101 receives an electromagnetic signal in the air and converts the same into an electrical signal in a wire.

Next, since the signal received through the antenna contains undesired frequencies, a band select filter 1102 performs bandpass filtering to amplify only a desired frequency band. If multiple channels are in use, the band select filter may need to pass all channels (in-band). If the same antenna is used, a duplexer may perform the function of the band select filter.

Next, a low noise amplifier (LNA) 1103 amplifies the received signal containing noise in the air such that the signal is amplified with the noise attenuated as much as possible.

Next, in order to prevent a image frequency in the signal amplified by the LNA from being delivered to a mixer, an image reject filter (IRF) 1104 performs bandpass filtering again. Additionally, the IRF removes spurious frequencies, and the RF terminal is separated from the IF terminal to ensure stability of the receiver.

Next, an RF down mixer 1105 down-converts the frequency of a low-noise amplified RF signal to a frequency in the IF band.

Next, an RF local oscillator (RF LO) 1106 supplies an LO frequency for frequency synthesis to the RF down mixer. For communication requiring channel selection, the LO frequency may be changed to perform channel selection.

Next, a phase locked loop (PLL) 1107 tunes the output frequency of the RF LO to a predetermined frequency such that the output frequency does not vary. That is, the PLL serves to perform frequency tuning of shifting and fixing the output frequency of the RF LO to a desired frequency by precisely adjusting the voltage of the VCO used as the RF LO through input for control.

Next, the signals converted to IF frequencies contain several channels, and a channel select filter 1108 selects a desired channel from among the channels through bandpass filtering. Since spacing between the channels is narrow, a filter having a good skirt property is needed.

The weak received signal may not be amplified sufficiently by the LNA of the RF terminal alone, and accordingly the signal needs to be amplified significantly through an IF AMP after channel filtering. When precise power adjustment is needed, an IF amplifier 1109 adjusts the gain of the IF AMP to VGA or AGC.

Next, an IF down mixer 1110 finishes channel selection and amplification and removes the carrier frequency, thereby changing the signal to the baseband, which is a frequency band containing the original signal. That is, the IF down mixer 1110 performs down conversion mixing.

Next, an IF local oscillator (IF LO) supplies an LO frequency to the IF mixer for converting the IF into the baseband. To fix the LO frequency, an IF PLL may be additionally used.

Figure 12:
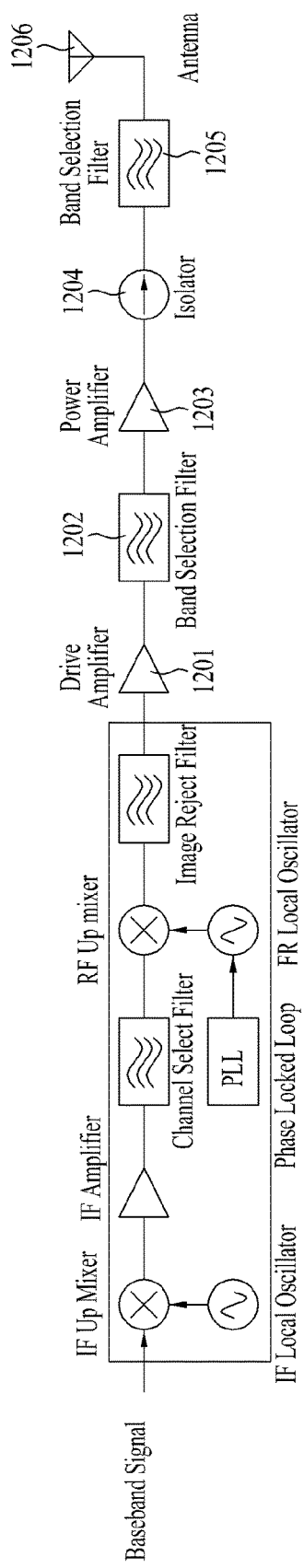
FIG. 12 illustrates an exemplary RF transmitter employed in a wireless access system.

FIG. 12 illustrates an exemplary RF transmitter employed in a wireless access system.

A drive amplifier (DA) 1201 will be described first. In contrast with the Rx terminal, the Tx terminal has a predetermined input signal. In many cases, a power amplifier (PA) serving to amplify the input signal to a signal of a significantly large power does not have sufficient gain due to the structure thereof. In addition, in order for the PA to sufficiently amplify the power of the signal, the input signal needs to have power of a certain level. The DA serves to solve lack of gain of the PA and create sufficient input power for the PA.

Next, a description of a band select filter (BSF) 1202 will be given. Since the DA is an amplifier having nonlinearity, an unnecessary frequency output component may be produced. To avoid amplifying such frequency component in the PA, the BSF passes only channel bands in use.

Next, a power amplifier (PA) 1203 is the most important constituent in the RF and Tx units. The PA serves to amplify power to allow the terminal end to send a signal having a sufficient power.

Next, a description of an isolator will be given. The transmit terminal is not intended to receive a signal, but there is a possibility that a signal is input to the transmit terminal through an antenna. Accordingly, signal echo needs to be fixed such that signals are delivered only in a specific direction. Signals directed in the output direction are allowed to be delivered, but signals coming in the opposite direction are terminated in order to prevent reverse signal delivery. That is, introduction of a signal in the reverse direction is prevented to prevent disturbance of impedance of the PA output terminal. Thereby, damage to the PA may be prevented.

Next, a description of a band select filter (BSF) 1205 will be given. As in the case of the DA terminal, nonlinear spurious frequency components may appear at the rear side of the nonlinear amplifier. Accordingly, in order to remove such components and to emit only a desired frequency band, bandpass filtering is performed for the last time. For a system sharing an antenna with the receive terminal, the duplexer may perform this function.

Next, an antenna 1206 serves to finally radiate electrical signal change in a wire in the form of an electromagnetic wave.

Hereinafter, a description will be given of a duplexer and a diplexer.

Multiplexing refers to sharing and distributing multiple signals. A multiplexer refers to a constituent configured to send multiple signals through one line and to re-collect or distribute the same.

Duplexing refers to sharing one path by two signals. In a system, "two signals" refers to a transmitted signal and a received signal. Schemes for sharing transmitted and received signals using one transmission line or antenna may include TDD and FDD. When one antenna needs to be shared for a transmit frequency and a receive frequency in FDD, a duplexer is needed in order to make the transmit signal frequency and the receive signal frequency to be delivered through the transmit terminal, the receive terminal and the antenna as intended without being mixed with each other. That is, the duplexer serves to divide the transmit terminal and the receive terminal while using the same antenna. As the duplexer is used, the transmit terminal and the receive terminal may be supported with one antenna, and thus the antenna may be efficiently shared.

Figure 13:
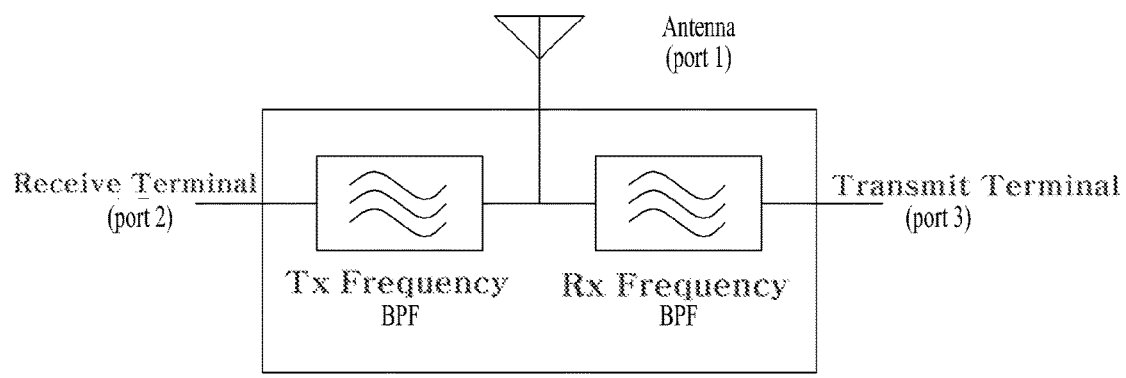
FIG. 13 illustrates an example of configuration of a duplexer.

FIG. 13 illustrates an example of configuration of a duplexer. Referring to FIG. 13, the duplexer may be configured by arranging a band pass filter (BPF) which passes only a transmit frequency and a BPF which passes only a receive frequency next to each other and properly matching the middle of the filters with an antenna.

Figure 14:
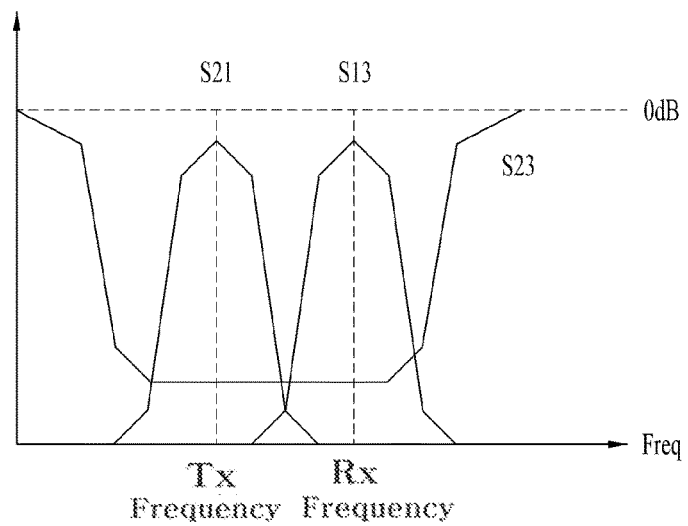
FIG. 14 illustrates a duplexer in a frequency band.

FIG. 14 illustrates an exemplary duplexer in a frequency band. S21 and S13 denote transmission of power from port 1 to port 2 and port 3, respectively. According to properties of the filters, each BPF may have a high degree of pass at the BPF pass frequency. S23 denotes transmission of power between the transmit terminal and the receive terminal. This power is suppressed to the lowest level in both the transmit/receive frequency bands.

The diplexer refers to dividing a transmit terminal and a receive terminal while using the same antenna. The diplexer may be configured using an LPF and an HPF. For example, when a signal is transmitted and received using a wired path, the diplexer may be used if there are only a transmitted signal and received signal in the closed line without any other frequencies. The diplexer may also be used when a multi-band terminal supports both 100 MHz cellular CDMA and 1.8 GHz PCS CDMA simultaneously.

Hereinafter, phase shift will be described.

Phase shift refers to electrically or mechanically changing the phase of a signal. Phase shift may be used by an RF analog signal processing terminal for beam control and phase modulation of a phased array antenna.

As a first method of changing the phase, the length of the line may be mechanically changed. For example, when two coaxial metal lines are arranged to overlap each other, the length of the line may be changed by pushing in and withdrawing one coaxial pipe. With this method, the phase may be continuously changed and loss is low. On the other hand, it takes a long time to change the phase and the phase change is large since the phase is changed mechanically.

As a second method for changing the phase, cable switching may be used. This is one of phase shift methods for electrically changing the length. This method may be implemented by deploying multiple transmission lines having different lengths and switching the path among the cables using a switch. With this method, a compact design may be implemented and it takes a short time to change the phase. On the other hand, since this method is implemented in a digitized manner, it is not possible to continuously change the phase value and high loss is produced compared to the case of the mechanical change method. For example, a 4-bit phase shifter operating according to the cable switching method may change the phase from 0 to 337.5 in increments of 22.5.

A third method for changing the phase is reflection. Similar to light whose phase is changed when the light is reflected from an object, an electrical signal is reflected at a point where impedance changes along with change of the phase. Specifically, the insertion phase may be adjusted according to the value of a device connected in the middle of the transmission line. With this method, insertion loss may increase and the impedance property may be deteriorated.

A fourth method for changing the phase is divided into loaded line type and hybrid coupled type. This method is also one of phase shift methods for electrically changing the length. This method is often used for a digital phase shifter. Loaded line type is used by a phase shifter producing phase shift within 45°, and hybrid coupled type is used by a phase shifter producing phase shift greater than or equal to 45°. For example, the phase may be changed using change of reactance which occurs when a PIN diode is turned on/off.

A fifth method for changing the phase is to use a vector modulator phase shifter. According to this method, a signal having a necessary phase is obtained by adjusting the amplitudes of two orthogonal components according to a desired phase and combining the components at a synthesizer.

Hybrid Beamforming

Figure 15:
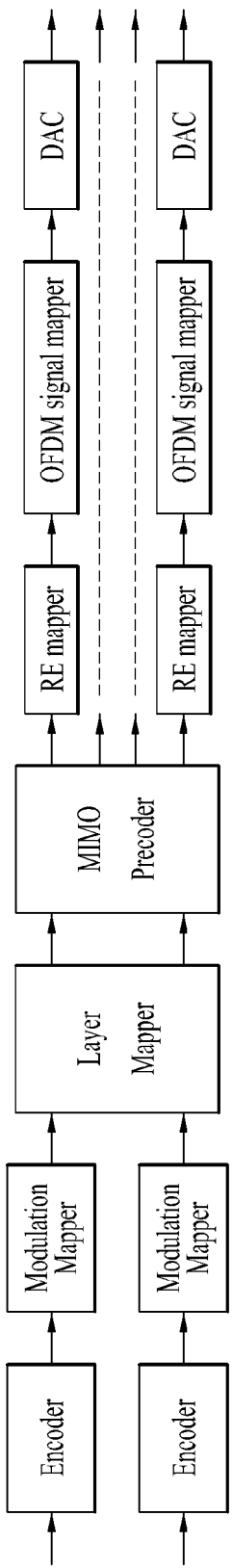
FIGS. 15 and 16 illustrate an example of configuration of a transmit terminal and receive terminal which are capable of performing digital beamforming.
Figure 16:
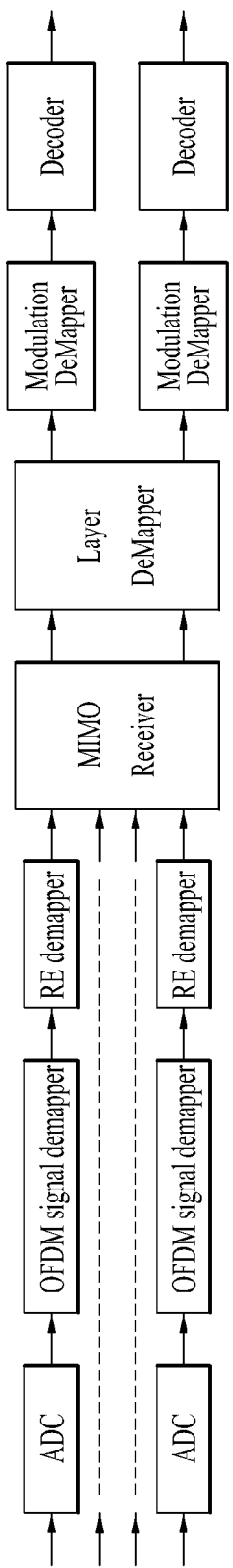

FIGS. 15 and 16 illustrate an example of configuration of a transmit terminal and receive terminal which are capable of performing digital beamforming.

In the digital beamforming technique, a baseband terminal changes the phase and amplitude for beamforming for each antenna port, using a signal processing technique. The digital beamforming technique enables independent and precise beamforming in each frequency band. Accordingly, the digital beamforming technique requires an independent baseband signal processing block for each antenna port.

Figure 17:
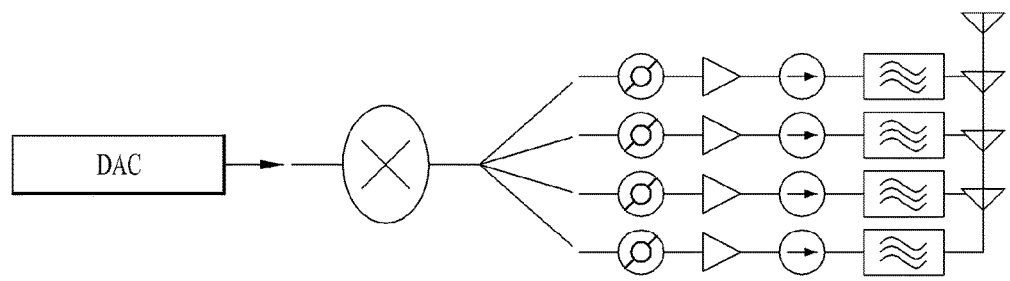
FIGS. 17 and 18 illustrate an example of configuration of a transmit terminal and receive terminal which are capable of performing analog beamforming.
Figure 18:
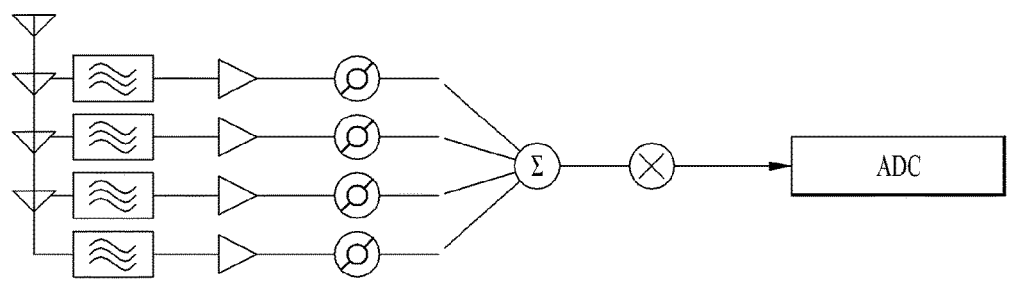

FIGS. 17 and 18 illustrate configuration of a transmit terminal and receive terminal which are capable of performing analog beamforming.

In the analog beamforming technique, an RF terminal changes the phase and amplitude of a signal delivered in the baseband for each antenna element to form a beam. Since beamforming is performed by the RF terminal, a relatively small number of baseband signal processing blocks is used and thus baseband hardware complexity may be low. However, according to the analog beamforming technique, variable beamforming is performed in the time domain, while the same beamforming is performed over the full band in the frequency domain. Thereby, a degree of freedom in beamforming is low and the accuracy of the created beam is low.

Massive MIMO-based wireless communication may improve signal quality and performance and energy efficiency and remove multi-user interference, using multiple antennas. As the number of antennas increases, these advantages may be enhanced. On the other hand, as the number of antennas increases, the number of baseband signal processing blocks also increases and thus signal processing complexity and hardware complexity may increase.

To lower hardware complexity while maintaining the gain of massive MIMO, hybrid beamforming, combining digital beamforming and analog beamforming, may be used.

Digital beamforming has a high degree of freedom for performing different beamforming in respective frequency bands. However, if analog beamforming, which creates the same beam in a frequency band in use, is combined with digital beamforming, the degree of freedom for beamforming may decrease compared to beamforming implemented using the digital beamforming technique alone. Such combination may lower the degree of freedom for multi-user transmission, thereby lowering the multi-user gain which may be obtained through massive MIMO.

Accordingly, in using the hybrid beamforming technique, a method for selecting an optimum beamforming coefficient which may maintain the degree of freedom for multi-user transmission is required.

Embodiment 1

This embodiment relates to the hybrid beamforming technique for multi-user transmission.

According to the hybrid beamforming technique, analog beamforming and digital beamforming are performed simultaneously. When hybrid beamforming is employed in a massive BMIMO system, it is important to maintain the resolution of beams and the degree of freedom for massive multi-user transmission. In Embodiment 1, a hybrid beamforming technique satisfying the two requirements will be described.

First, analog beamforming is described below. For analog beamforming, an RF terminal having a phase shifter is used. Analog beamforming superposes beams emitted from multiple antenna elements to concentrate the energy of the beams in a specific direction to create a sharp beam (in a doughnut shape or pencil shape). Herein, the beamforming direction may be adjusted by changing the value of phase shift.

The analog beamforming causes phase change in one analog signal and causes the signal to be transmitted or received through multiple antennas. With analog beamforming, phase change varying with time may be implemented. On the other hand, since the phase of the signal changes in the analog domain, signals sharing a transmission band at the same time are given the same phase. That is, wideband transmission is performed, but narrowband beamforming is difficult to implement.

If N independent phase shifters are used for analog beamforming, N independent beams which are spatially distinguishable may be formed. The independently formed beams may be allocated to one user and thus N paths may be established. Alternatively, the beams may be allocated to N users to perform multi-user transmission. To transmit N different data through N beams, N independent basebands are required.

Next, digital beamforming is described below. Digital beamforming is associated with MIMO transmission employing passive antennas.

According to MIMO transmission employing passive antennas, broad beams radiated from multiple passive antennas are superposed through digital processing and the energy thereof is concentrated in a specific direction to create a sharp beam. The sharp beams created through beamforming are within the range of azimuth angles at which broad beams formed by the passive antennas are transmitted.

In the MIMO system employing passive antennas, digital beamforming combines beams formed by passive antennas through digital domain processing to create a directional beam. Creation of directionality may be performed independently for each narrowband. In addition, since digital beamforming adjusts the coefficient in the digital domain, a high-resolution beam may be formed.

According to MU-MIMO transmission employing passive antennas, broad beams formed by multiple passive antennas are superposed through digital processing to create multiple sharp beams. Thereafter, beams which are as orthogonal as possible are selectively used to perform simultaneous transmission to attenuate interference between users in performing transmission to specific users. That is, in performing multi-user transmission, beams of the analog domain are not spatially distinguished from each other, but beams created by the digital beamformer are spatially distinguished.

Hereinafter, a description will be given of hybrid beamforming for supporting multi-user transmission based on the analog beamforming and the digital beamforming described above.

In hybrid beamforming, a degree of freedom for calculating beamforming weights is given not only in the digital domain but also in the analog domain. In the MIMO system performing digital beamforming through a baseband operation, if an RF terminal having a variable phase shifter and a power amplifier is introduced to an antenna element to perform analog beamforming, hybrid beamforming for performing digital beamforming and analog beamforming simultaneously may be implemented.

Conventional technologies associated with hybrid beamforming mainly focus on determining an optimum weight for hybrid beamforming from a single user perspective. Research on hybrid beamforming has proposed methods of calculating an optimum weight in consideration of weights of the digital domain and analog domain. Such research focuses on calculating an optimum weight from a single user perspective. In addition, an optimum beamforming weight is calculated on the assumption that creating multiple beams in the analog domain is intended to collect energy of multi-path transmission.

It is difficult to apply the optimum weight for hybrid beamforming conventionally researched in the single user perspective to multi-user transmission. Beamforming performed in the time domain may be beamforming for a single user. Accordingly, if multi-user transmission having different channel situations for respective users needs to be performed, it is difficult to adopt the method of calculating beamforming weights in consideration of a single user.

Accordingly, there is a need for a hybrid beamforming method for supporting multiple multi-user transmissions, which are the benefit of massive MIMO.

Hereinafter, a description will be given of an antenna type and a beamforming method which are assumed in embodiments of the present invention.

Figure 19:
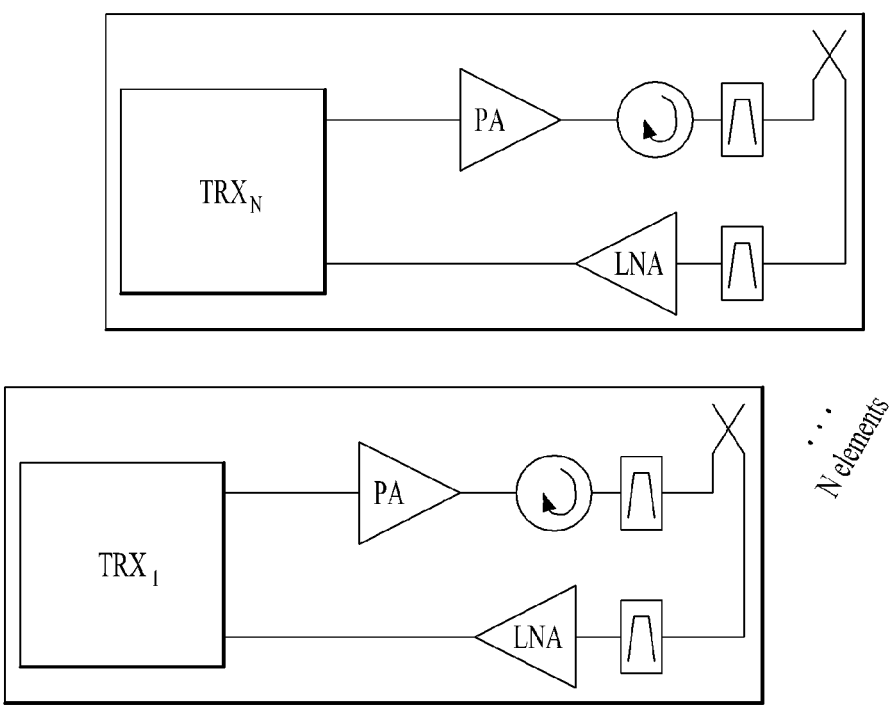
FIG. 19 illustrates an exemplary structure of an individual antenna employing one transceiver and one PA.

FIG. 19 illustrates an exemplary structure of an individual antenna employing one transceiver and one PA.

Referring to FIG. 19, K (=N) antenna elements and N transceivers (TRXs) are used. Each TRX is mapped to one antenna element and has one PA. In the structure of FIG. 19, N antenna elements may be used to perform full digital beamforming.

Figure 20:
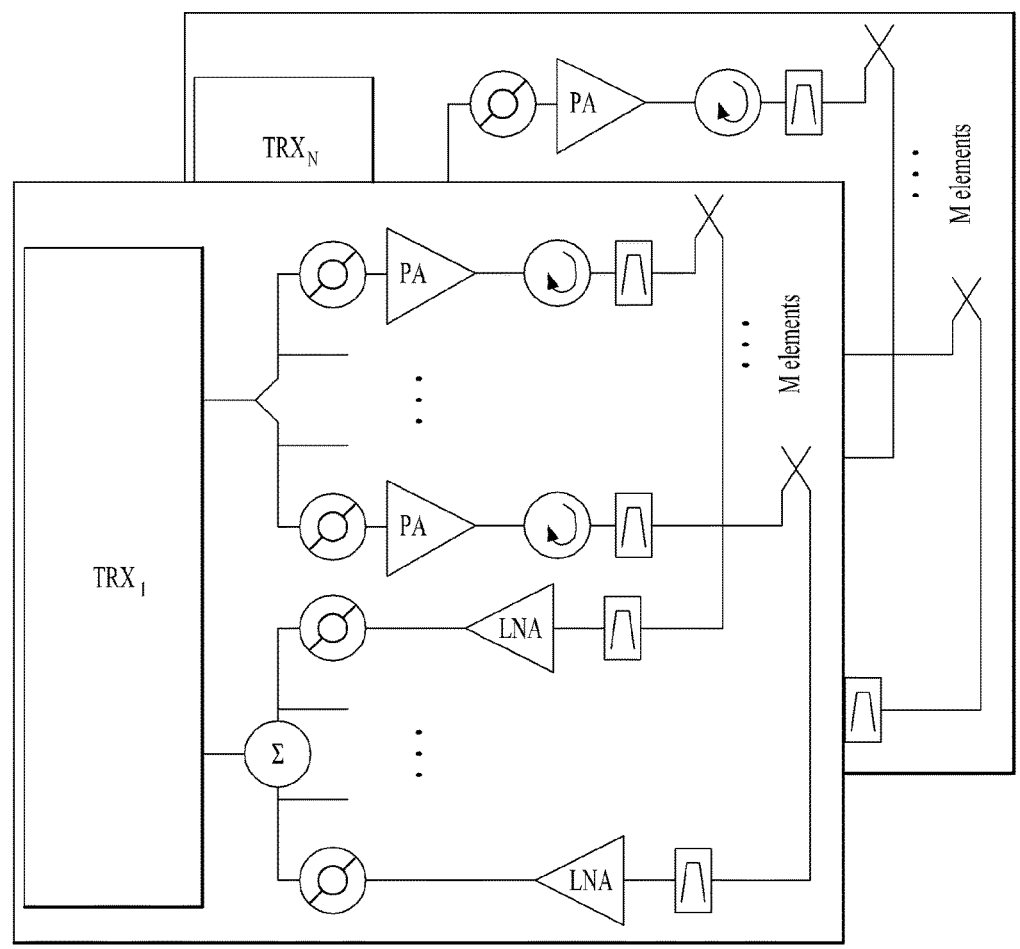
FIG. 20 illustrates an exemplary structure of an individual antenna employing one transceiver and a plurality of PSs/PAs.

FIG. 20 illustrates an exemplary structure of an individual antenna employing one transceiver and a plurality of PSs/PAs.

Referring to FIG. 20, K (>N) antenna elements, N TRXs and antennas which are independent for respective TRXs are used. Each TRX is mapped to M antenna elements, and has M PSs/PAs. Analog beamforming is performed using M antenna elements, and digital beamforming is performed using N TRXs.

Figure 21:
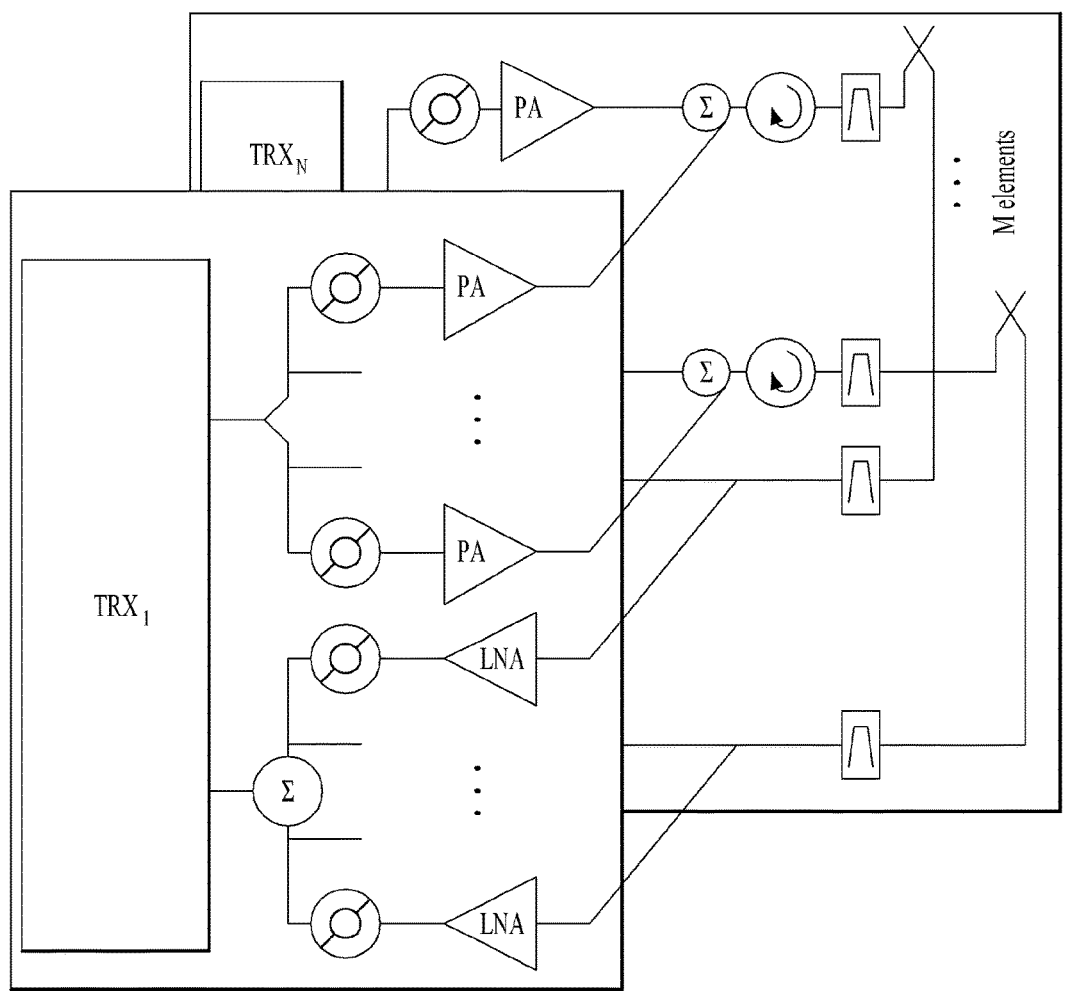
FIG. 21 illustrates an exemplary structure of a shared antenna employing one transceiver and a plurality of PSs/PAs.

FIG. 21 illustrates an exemplary structure of a shared antenna employing one transceiver and a plurality of PSs/PAs.

Referring to FIG. 21, K (>N) antenna elements and N TRXs are used, and the antenna is shared by the TRXs. Each TRX is mapped to M antenna elements, and has M PSs/PAs. Analog beamforming is performed using M antenna elements, and digital beamforming is performed using N TRXs. Herein, multiple analog beamforming operations may be performed through one antenna.

Figure 22:
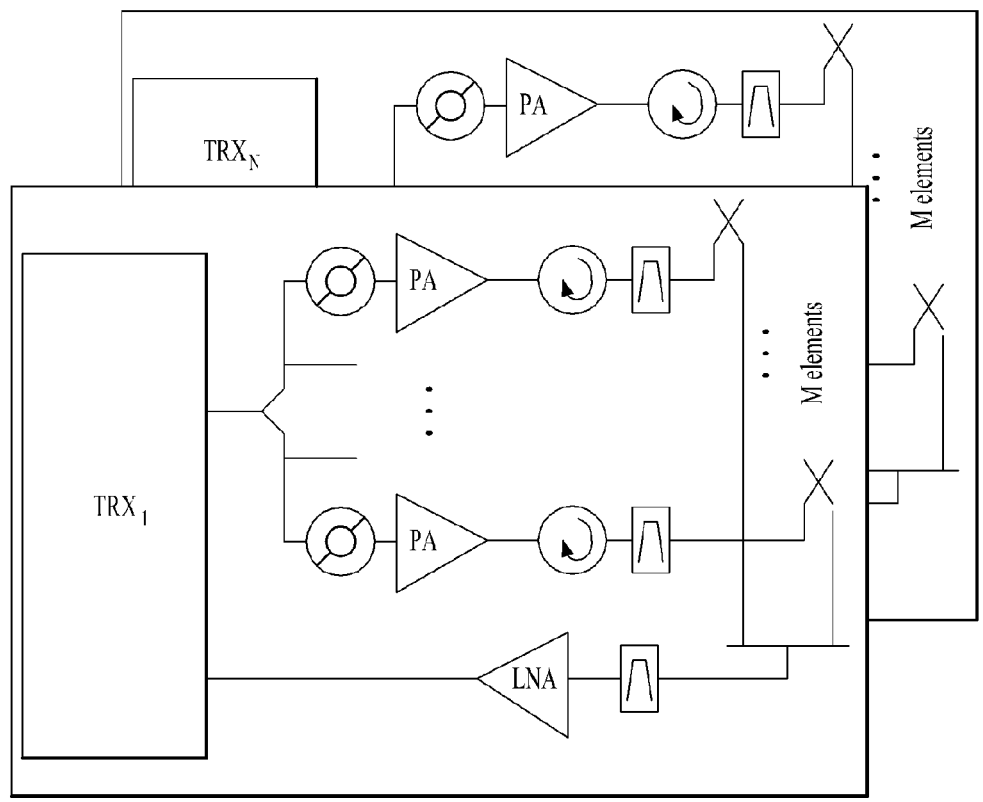
FIG. 22 illustrates an exemplary structure of an individual antenna employing one transceiver and a plurality of PSs/PAs.

FIG. 22 illustrates an exemplary structure of an individual antenna employing one transceiver and a plurality of PSs/PAs.

Referring to FIG. 22, K (>N) antenna elements, N TRXs, and antennas which are independent for the respective TRXs are used. Each TRX is mapped to M antenna elements and has M PSs/PAs. In contrast with the example of FIG. 20, the transmit terminal has multiple PSs/PAs, while the receive terminal has a single RF receiver. The TX terminal performs analog beamforming using M antenna elements, and performs digital beamforming using N TRXs. The RX terminal performs fixed beamforming, and performs digital beamforming using N TRXs.

Figure 23:
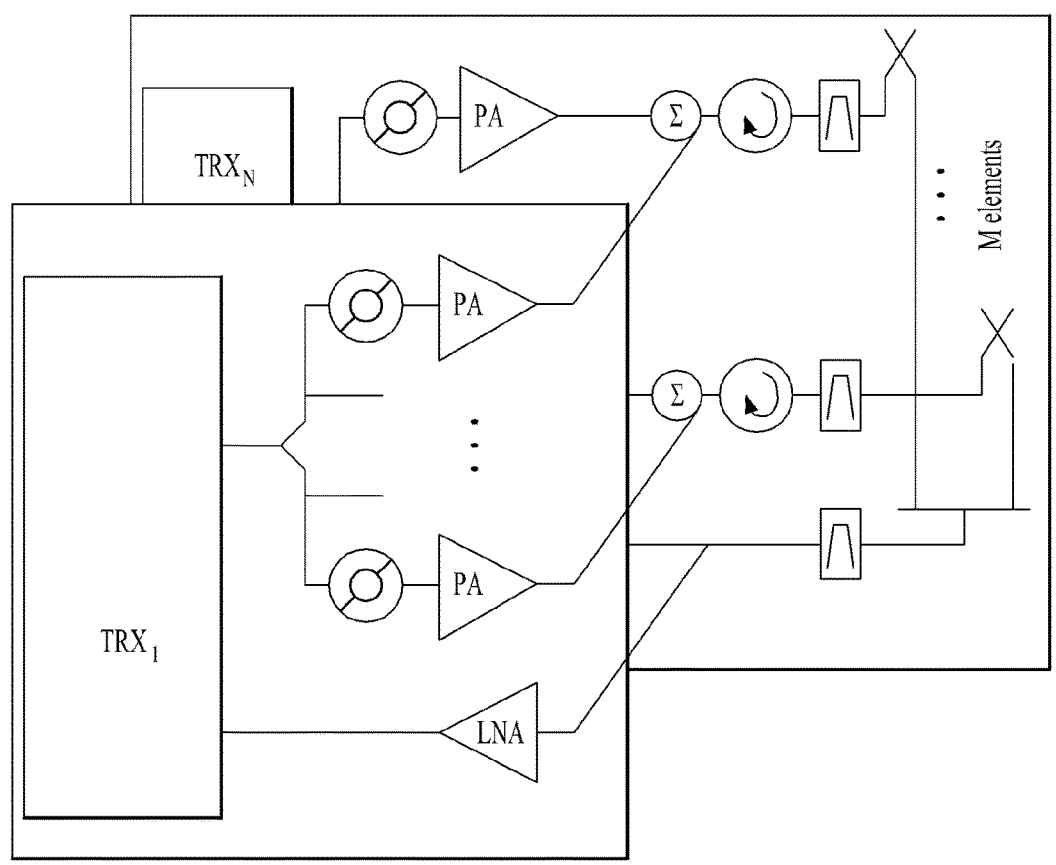
FIG. 23 illustrates an exemplary structure of a shared antenna employing one transceiver and a plurality of PSs/PAs.

FIG. 23 illustrates an exemplary structure of a shared antenna employing one transceiver and a plurality of PSs/PAs.

Referring to FIG. 23, K (>N) antenna elements and N TRXs are used, and the antennas are shared by the TRXs. Each TRX is mapped to M antenna elements, and has M PSs/PAs. In contrast with the example of FIG. 21, the transmit terminal has multiple PSs/PAs, while the receive terminal has a single RF receiver. The Tx terminal performs analog beamforming using M antenna elements, and performs digital beamforming using N TRX. In addition, multiple analog beamforming operations may be performed through one antenna. The Rx terminal performs fixed beamforming, and performs digital beamforming using N TRXs.

Hereinafter, a description will be given of a method for distinguishing between multiple users using hybrid beamforming. First, a wide area is divided into several sections. Specifically, multiple broad beams are created using an analog beamformer. Next, a divided section is divided into narrow regions. That is, a few analog beams directed to similar places are synthesized through digital processing to create a narrow beam.

Embodiment 1-1

Embodiment 1-1 of the present invention relates to a method for distinguishing between multiple users using hybrid beamforming.

Figure 24:
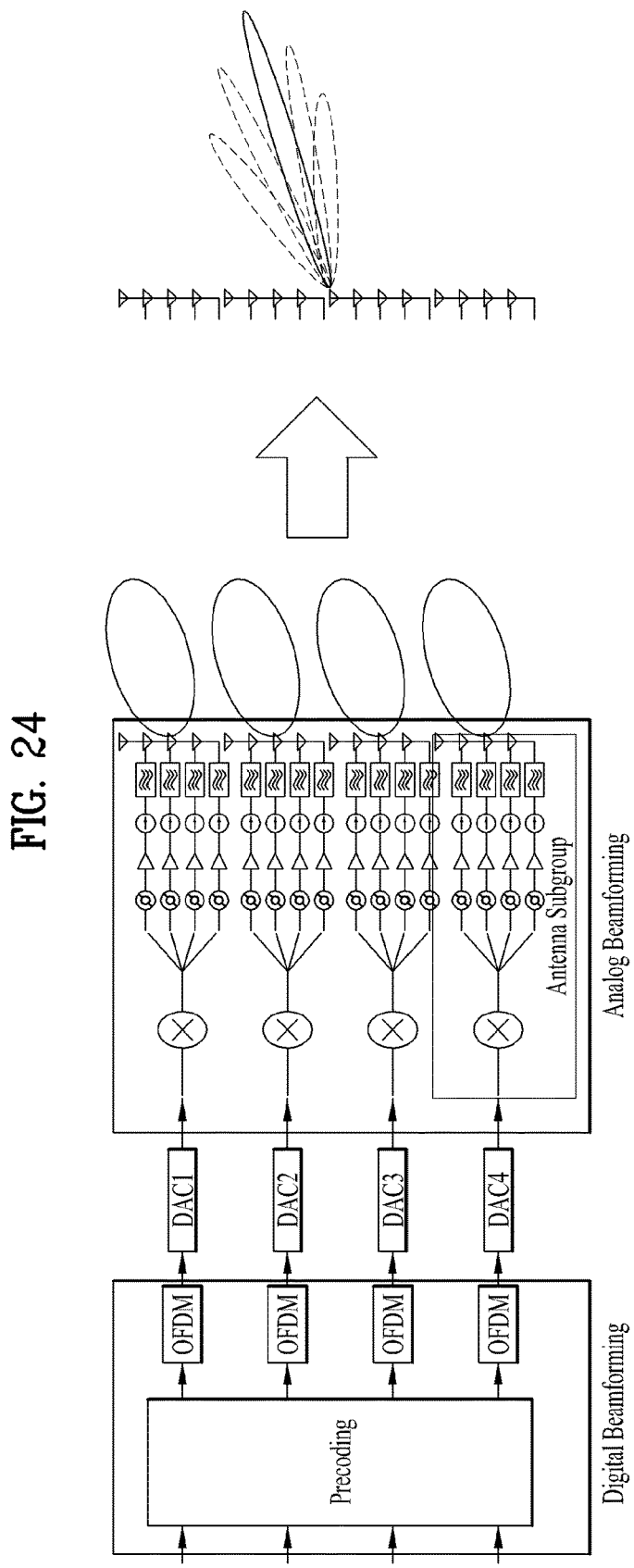
FIG. 24 illustrates an embodiment of distinguishing among multiple users in hybrid beamforming according to the present invention.

FIG. 24 illustrates an embodiment of distinguishing among multiple users in hybrid beamforming according to one embodiment of the present invention.

First, antenna elements are grouped into subgroups. For example, using a method such as the methods of FIGS. 20 and 22, antenna elements may be grouped into subgroups.

Thereafter, analog beamforming is performed for each subgroup. An analog beam formed by a subgroup has a wide beamwidth. The analog beamformer forms beams in various directions to distinguish among several spaces.

A signal processor of the digital domain synthesizes multiple beams formed by subgroups. Using independent space-channel characteristics of users in the space within a range in which an analog beam is directed, a weight for synthesizing multiple beams may be generated. Using the weight, multiple users may be distinguished from each other.

For example, when antenna subgroups #1 to #4 create 4 independent beams (through analog beamforming), 4 independent radio channels may be established. The 4 radio channels are mapped to 4 antenna ports. Then, multi-stream transmission (digital beamforming) is performed using a transmit precoder that supports the 4 antenna ports.

Figure 25:
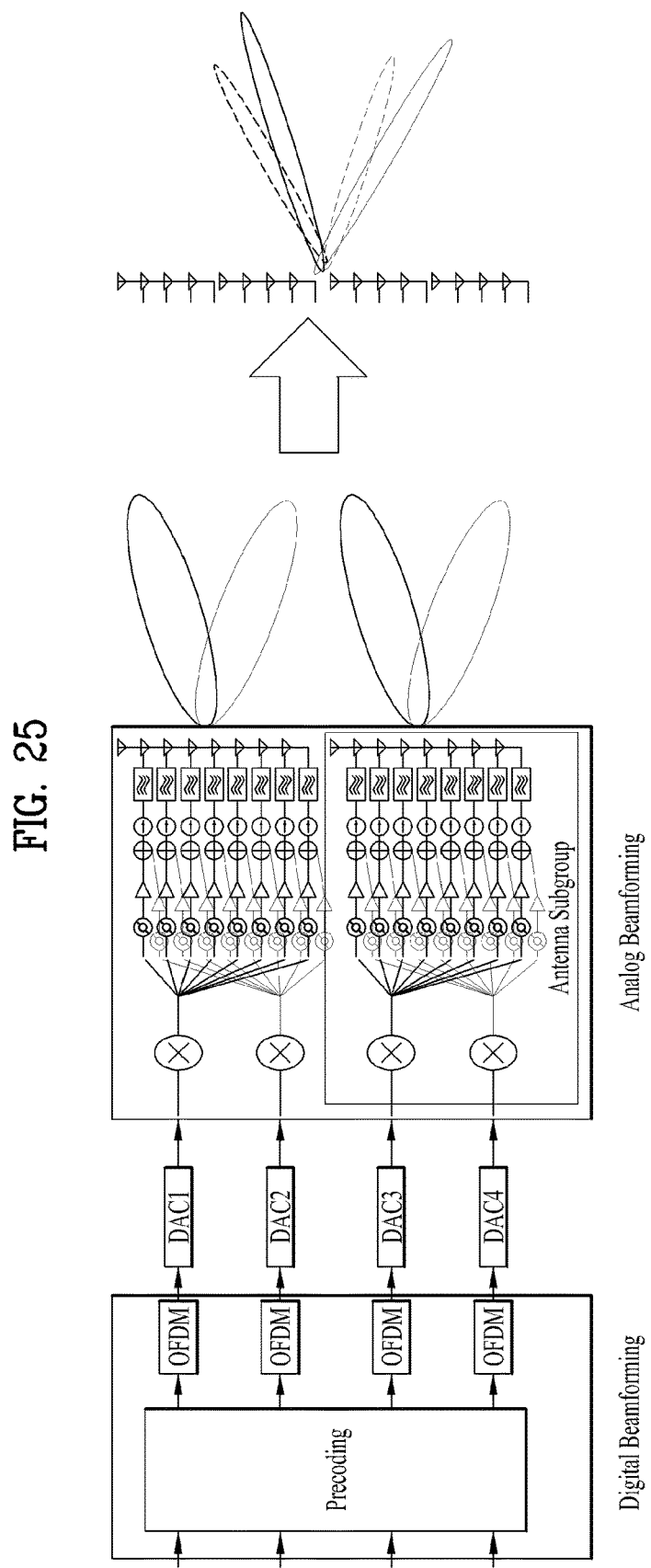
FIG. 25 illustrates another embodiment of distinguishing among multiple users in hybrid beamforming according to the present invention.

FIG. 25 illustrates an embodiment of distinguishing among multiple users in hybrid beamforming.

Referring to FIGS. 21 and 23, signals generated by multiple phase shifters (PSs)/power amplifiers (PAs) are synthesized and transmitted through one antenna element. Analog beamforming is performed for each PS/PA, and beams are created in various directions to distinguish among spaces. That is, if multiple PSs/PAs are used, beams may be created in various directions.

In addition, as shown in FIG. 25, multiple PSs/PAs may be configured for each antenna subgroup. In this case, multiple beams may be created in each antenna subgroup.

The signal processor of the digital domain may generate signals such that analog signals (independent signals) having different waveforms according to the respective PSs/PAs may be generated by the DAC and transmitted. Precoding of the digital beamformer serves to synthesize analog beams generated by the antenna subgroups and multiple PSs/PAs.

For example, if two independent beams are generated by each of antenna subgroups #1 and #2 (through analog beamforming), and thus all 4 beams (analog beams) are generated, 4 independent radio channels may be established. The 4 radio channels are mapped to 4 antenna ports. Then, multi-stream transmission is performed using a transmit precoder supporting the 4 antenna ports (digital beamforming).

Embodiment 1-2

Embodiment 1-2 of the present invention relates to an analog beamforming method for effectively performing hybrid beamforming in performing multi-user transmission.

The structures of FIGS. 20 and 22 allow each subgroup to have a degree of freedom for creation of beams such that the respective subgroups may transmit beams simultaneously in different directions. The structures of FIGS. 21 and 23 may provide a degree of freedom for creation of beams to respective PSs/PAs, thereby allowing the PSs/PAs to transmit beams in different directions simultaneously. The structure of FIG. 25 may provide a degree of freedom for creation of beams to each subgroup and each PS/PA, thereby allowing the subgroups and PSs/PAs to transmit beams in different directions simultaneously.

Distinguishing among areas means that spaces to which analog beams are directed are different from each other. Analog beams improve the channel condition by concentrating energy in a specific direction. That is, an area where the energy is concentrated is significantly different from the other areas where the energy is not concentrated in terms of channel conditions. SDMA and TDMA may be employed to transmit signals to users within an area covered by a transmission point, using a beamforming technique. Embodiment 1-2 proposes an analog beamforming method for effectively performing hybrid beamforming in performing multi-user transmission.

First, a description will be given of an analog beamforming method for effectively performing hybrid beamforming for multi-user transmission when the SDMA is used.

In the SDMA, multiple beams are formed at the same time. If beams concentrating energy in different directions are transmitted simultaneously, signals may be transmitted to users in different areas using the different beams with signal interference attenuated. However, if many subgroups use many beams in different directions simultaneously, the distance between beams decreases and thus interference between the beams is likely to occur. Interference between beams may be effectively attenuated if the subgroups select and transmit beams which are far away from each other rather than simply transmitting different beams.

As a first method for selectively transmitting beams far away from each other simultaneously from the subgroups in the SDMA, at least two subgroups generate beams in the same direction. Each PS/PA belonging to a subgroup forms an independent beam.

As a second method for selectively transmitting beams far away from each other simultaneously from subgroups in the SDMA, multiple users are distinguished from each other using digital beamforming for signals of subgroups forming beams in the same direction.

Next, a description will be given of an analog beamforming method for effectively performing hybrid beamforming for multi-user transmission in the TDMA.

If beams concentrating energy in one direction are persistently transmitted, the channel condition spectrum from the good condition to the bad condition within an area covered by a transmission point is wider than when an omnidirectional antenna is used. To address this issue, an area where the energy is concentrated may be differently configured in a time unit. In this case, each subgroup transmits an independent beam, and the direction of beams transmitted from the respective subgroups may be set differently according to time. However, if the direction of the beams changes with time, measurement and reporting become complex.

Accordingly, as a first method to simplify measurement and CSI reporting, the transmission direction of a beam may be changed based on a subframe (a basic unit for scheduling in the time domain). As a second method, a time unit for performing the same measurement may be designated to reflect change in the channel condition according to change in the transmission direction of the beam. For example, a subframe set for performing the same measurement may be defined using a bitmap and be indicated through a higher layer signal. As a third method, subgroups forming beams in the same direction may maintain the subgroup combination for performing beamforming even if the beams change with time.

Embodiment 1-3

Embodiment 1-3 relates to a digital beamforming method for effectively performing hybrid beamforming in multi-user transmission.

Features of antenna ports in terms of transmission and channel measurement in the legacy MIMO system will be described first. The channels of antenna ports used for signal transmission (e.g., antenna port (AP) 5 and APs 7 to 14 in LTE) change according to a transmission precoding weight applied in the frequency domain and time domain. On the other hand, antenna ports used for measurement (e.g., APs 15 to 22 defined in LTE) have only time-varying channel characteristics according to Doppler effect.

Digital beamforming in the hybrid beamforming may be handled using a method similar to the method used for the legacy MIMO system. That is, if a synthesized channel established by the analog beamformer described above is considered as an antenna port, the hybrid BF may be viewed as a MIMO transmission method (digital BF) employing multiple antenna ports created through analog beamforming. In contrast with the antenna ports of the legacy MIMO system, the channel situation may be changed by analog beamforming. For example, the channel may be changed according to the number of antenna subgroups, a method for configuring subgroups, a beamforming technique applied to the subgroups, and the like.

As a method for effectively performing digital beamforming in hybrid beamforming, the type and value of a precoding weight used for digital beamforming in hybrid beamforming is determined according to the number of transmitted beams generated by analog beamforming and a precoding weight used for analog beamforming. For example, if the number of transmitted beams is 4, a transmit precoder having 4 antenna ports is used. In this case, the transmission precoding weight is selected in consideration of a transmission precoding weight used for analog beamforming. If the precoding weight for analog beamforming is maintained for a specific time and then changed, the precoding weight for the digital beamforming should be changed no later than the time at which precoding of analog beamforming is changed.

As another method, digital beamforming may serve to compensate for a phase difference among N channels created by an A-beam. In addition, digital beamforming may be performed on a narrowband basis. In digital beamforming, M (<=N) independent signals may be transmitted over the N channels created by the A-beam. To transmit M independent signals, a transmit precoder is configured.

Embodiment 1-4

Embodiment 1-4 relates to a scheduling method for supporting multi-user transmission in hybrid beamforming.

First, it is preferable in a long-term to distinguish among users through analog beamforming. Specifically, a user set to which analog beamforming is to be applied is created according to an analog beamforming weight.

Next, users are distinguished from each other through digital beamforming in a short term. Users who use analog beams directed in similar directions are distinguished from each other by a beam created by synthesizing multiple analog beams through digital processing.

Embodiment 2

Embodiment 2 relates to a method for applying antenna subgrouping for efficient hybrid beamforming.

Training sequences for analog beamforming are transmitted. In performing analog beamforming, the RF terminal applies values of phase and amplitude to respective antenna elements, and thus training sequences for selecting proper phase/amplitude values are transmitted.

Alternatively, analog beamforming is performed for each antenna subgroup. If antenna elements are grouped into antenna subgroups, analog beamforming may be performed subgroup by subgroup. In this case, analog beamforming may be independently performed for each subgroup. For example, when one antenna subgroup consists of 4 antenna elements, independent phase and amplitude values may be applied to each of the 4 antenna elements to perform beamforming. A degree of freedom enabling beamforming for 16 subgroups in different directions is provided.

In Embodiment 2, a description will be given of methods for designating and indicating a subgroup which is a basic unit of analog beamforming performed using antenna elements in hybrid beamforming and an operation of a receive terminal of discovering and reporting a precoding weight for analog beamforming.

Embodiment 2-1

Embodiment 2-1 relates to defining an antenna subgroup as a set of antenna elements.

An antenna subgroup (AS), which is a set of antenna elements (AEs), may serve as a basic unit of analog beamforming. According to hardware design, multiple phase shifters (PSs)/power amplifiers (PAs) and a signal synthesizer may be implemented in an AS, and signals may be designed to be transmitted/received through one antenna such that multiple analog beams can be generated by one AS.

In a system having numerous AEs, ASs may be configured in various combinations. Various antenna arrays including linear array, planar array and circular array may be implemented according to how the antennas are arranged. For simplicity, a uniform planar array (UPA) will be described as an example. Various combinations may be used to configure one subgroup according to how many AEs are defined to be used in the vertical domain (V-D) and horizontal domain (H-D). For example, suppose that a massive antenna having 64 AEs arranged in 8 rows along the V-D and 8 columns along the H-D is used. In this case, 4 combinations (1, 2, 4, 8) are obtained in each domain, and thus 16 combinations are provided for the subgroup.

The AS configuration (the number of AEs of the V-D×the number of AEs of the H-D) may be expressed using multiples of 2 including 1 as the number of AEs of the V-D and the number of AEs of the H-D as follows.

If there are 64 AEs provided, AS combinations of (1×1), (1×2), (1×4), (1×8), (2×1), (2×2), (2×4), (2×8), (4×1), (4×2), (4×4), (4×8), (8×1), (8×2), (8×4) and (8×8) may be derived.

Similarly, when 32 AEs (8×4) are provided, 12 AS combinations of (1×1), (1×2), (1×4), (2×1), (2×2), (2×4), (4×1), (4×2), (4×4), (8×1), (8×2) and (8×4) may be derived.

When 16 AEs (4×4) are provided, 9 AS combinations of (1×1), (1×2), (1×4), (2×1), (2×2), (2×4), (4×1), (4×2) and (4×4) may be derived.

When multiple ASs are configured, various beam patterns may be created by configuring the sets constituting the respective ASs differently. In this case, diversity of analog beamforming may be obtained, but there may be corresponding restrictions. When BF weights suitable for subgroups are calculated, weights suitable for the respective subgroups need to be discovered. If this operation is performed at the UE side, calculation complexity as well as reporting overhead may increase. In addition, when digital beamforming is performed to synthesize beams created by analog beamforming, performance is likely to be degraded due to gain imbalance between beams having different beamforming gains of analog beamforming. Accordingly, sets constituting respective ASs are preferably configured identically in a minimum unit for digital beamforming.

A first method according to Embodiment 2-1 is to apply the same subgrouping pattern to at least one antenna subgroup. The same subgrouping pattern may be applied to all antenna subgroups.

If the same subgrouping pattern is applied to antenna subgroups, complexity of calculation of a precoding weight for analog beamforming may be reduced. In addition, if antenna subgroups use analog beamforming precoding weights having the same phase increment/amplitude increment, complexity of calculation for beamforming and reporting overhead may be reduced.

A second method according to Embodiment 2-1 is to apply analog beamforming precoding weights having the same phase increment/amplitude increment to at least one of antenna subgroups to which the same subgrouping pattern is applied. Further, analog beamforming precoding weights having the same phase increment/amplitude increment may be applied to all antenna subgroups to which the same subgrouping pattern is applied.

Different subgrouping patterns may be applied to an AS according to time. Change of a subgrouping pattern means change of a channel state. In view of a temporal relationship between measurement of a channel and application of a pattern, a subgrouping pattern is preferably maintained at least for a duration in which CSI is reported and used for data transmission. For example, when the CSI reporting period is 5 ms, a subgrouping pattern is maintained for at least 10 ms.

As a method to dynamically change various subgrouping patterns, a time duration for which multiple subgrouping patterns are applied may be defined as a time set. In this case, the time set is maintained for at least one period of reporting. For example, M subgrouping patterns may be applied such that the patterns are dynamically changed for N time units, and a subgrouping pattern is maintained for a minimum time (e.g., a time interval of 10 subframes) which is taken to perform dynamic change of the patterns.

A third method according to Embodiment 2-1 is to apply the same subgrouping method to a selected antenna subgroup pattern for a certain time.

Information about subgroups may be provided through higher layer signaling. For example, the information may be provided through RRC signaling. This information may be UE-specific information or cell-specific information. A few candidate techniques may be configured as subgrouping techniques and one of the techniques may be designated using an indicator. The subgrouping technique designated by the indicator may be equally applied to one or more antenna subgroups.

A fourth method according to Embodiment 3 is to signal information about the subgroups to the UE through higher information.

Embodiment 2-2

Embodiment 2-2 relates to configuring an antenna subgroup as a block to generate an independent channel for signal transmission.

In relation to signals generated in a baseband (BB), an AS may be defined as a block to create an independent channel over which some of multiple signal sequences generated in the baseband are transmittable. For example, suppose that there are N ASs which form K analog beams, and M independent signal sequences are generated in the baseband and converted into analog signals through a digital-analog-converter (DAC). In this case, the M analog signals are transmitted through K*N analog beams.

A method to measure a channel and discover a precoding weight changes according to configuration of antenna subgroups or the number of beams transmitted from a subgroup. If the UE measures channels of antenna elements and discovers and reports analog beamforming precoding weights suitable for the respective subgroups, the UE discovers and reports weights suitable for a pattern of subgroups. To this end, a weight set to be used for the respective subgroups may be defined. For example, different weights need to be applied to configurations 4×2 and 2×2.

That is, a weight set varies according to antenna subgroup configurations. Further, when the UE measures a channel and discovers and reports a proper weight, the UE may discover a weight for the employed antenna subgrouping. In addition, a weight set for antenna subgrouping may be indicated or may be defined, tied with an antenna subgrouping pattern.

Embodiment 3

Embodiment 3 of the present invention relates to CSI for hybrid beamforming.

Specifically, in Embodiment 3, a description will be given of a method for reporting a channel state to support hybrid beamforming through which digital beamforming is performed after analog beamforming.

As a coarse beam, a beam having a broad width is used and directed in an approximate spatial direction. On the other hand, a fine beam employs a sharp beam which may be accurately directed to the position of a user. For example, when beamforming using 2 Tx antennas is compared with beamforming using 16 Tx antennas, a beam from the 2 Tx antennas has a greater width than a beam from the 16 Tx antennas. In addition, when a 3 dB beamwidth point is defined as a point to which different beams are directed, spacing between the beams is wider in the case of beamforming with 16 Tx antennas than in the case of beamforming with 2 Tx antennas. When variable beamforming is performed, the beamforming weight varies according to channel state. The beamforming weight for the coarse beam is less sensitive to change of the channel state than the beamforming weight for the fine beam.

For analog beamforming, the beamforming resolution may be determined by properties of elements such as a phase shifter and a power amplifier. Although it is possible to perform adaptive beamforming according to the situation of a UE, precise beamforming is limited due to limits of the elements. Accordingly, analog beamforming is proper for generation of a coarse beam.

On the other hand, digital beamforming is proper for generation of a fine beam because a degree of freedom for adjustment of the phase and amplitude in various ranges in the baseband is provided.

A first feature of channel state reporting according to the present invention is that CSI for analog beamforming is reported in a long interval/wideband. On the other hand, CSI for digital beamforming is reported with a periodicity shorter than or equal to the periodicity of reporting of the CSI for analog beamforming. In addition, the CSI for digital beamforming may be reported in a wideband or subband.

When a UE selects and reports a precoding weight for analog beamforming, information about the weight for analog beamforming is intermittently reported using a small number of bits, but robustness to reporting is important since precoding to be used for later transmission is determined based on the reported weight. As a method to robustly report information about analog beamforming, a very low MCS may be used, or CRC may be added to the information to check presence or absence of an error. As a transmission resource for reporting of the information, an uplink control channel or a part of the uplink data channel may be used. When the uplink control channel is used, the information may be transmitted at a low coding rate through QPSK modulation. In this case, the precoding weight for analog beamforming is coded and transmitted separately from feedback information such as other CSI or hybrid ARQ A/N and information such as an SRS request.

A specific indicator may be defined for precoding weight information for analog beamforming, and indicate a value reflecting spatial information about the horizontal domain or vertical domain.

The second feature of channel state reporting according to the present invention is that the precoding weight information for analog beamforming is measured and reported by the UE. This information may be reported through the uplink control channel or a part of the uplink data shared channel.

The CSI for analog beamforming and the CSI for digital beamforming are distinguished by the types thereof and reported at different times. For example, the CSI for analog beamforming is reported in a long interval. On the other hand, the CSI for digital beamforming is reported in a short interval.

The CSI for analog beamforming may be acquired through reporting from the UE or may be acquired using a signal (e.g., SRS) transmitted on uplink. What is important is that precoding used for analog beamforming is applied for a period longer than the period of application of digital beamforming. In this case, the CSI for digital beamforming may be acquired by defining a channel established by analog beamforming as an antenna port. In addition, the CSI acquired in this manner is reported through an uplink control channel or an uplink shared channel.

A third feature of channel state reporting according to the present invention is that a channel established by analog beamforming is defined as an antenna port, and a reference signal for the antenna port is used to measure the channel to calculate CSI for performing digital beamforming. The CSI for digital beamforming is reported through an uplink control channel or a uplink shared channel.

Information about measurement and reporting of the CSI for digital beamforming is determined according to a beam pattern selected by analog beamforming. The number of beams generated through analog beamforming is variable. In addition, when N beams are generated, synthesized channels are changed if the beamforming weight changes.

For example, when N beams are transmitted through analog beamforming, channels of N antenna ports are measured for digital beamforming, and elements are selected from a precoding matrix for the N antenna ports and reported.

In addition, when the precoding weight generated through analog beamforming is variable, multiple channels need to be measured for digital beamforming. In this case, a message of multiple reference signal transmission indications (including the number of antenna ports and frequency/time/code resource allocation information) is delivered to the UE.

In addition, when the number of beams generated through analog beamforming is variable, the number of antenna ports on which channels need to be measured for digital beamforming is also variable. In this case, a message of multiple reference signal transmission indications (including the number of antenna ports and frequency/time/code resource allocation information) is delivered to the UE.

A fourth feature of channel state reporting according to the present invention is that channel state measurement and reporting information for digital beamforming are determined according to a beamforming method for analog beamforming.

CSI for performing digital beamforming is calculated by measuring a channel from a reference signal corresponding to an antenna port which is transmitted according to a beam pattern selected by analog beamforming. CSI feedback for digital beamforming is defined in the PUSCH/PUCCH reporting mode.

In addition, a codebook for performing digital beamforming may change according to a beam pattern selected by analog beamforming.

In hybrid beamforming, analog beamforming and digital beamforming are performed simultaneously. A radiation pattern generated by analog beamforming determines signal transmission coverage. In a multi-antenna system using the AAS, a degree of freedom for adjusting the tilting angle of the antenna through analog beamforming is given. If the tilting angle is adaptively changed according to distribution of users in a cell, improvement of system performance and energy efficiency may be expected. A method for performing analog beamforming adaptive to users in a cell will be described below. Beamforming may be determined by the BS based on channel information measured and reported by the UE, or may be determined by the BS according to an uplink signal measured by the BS.

First, a description will be given of determination of beamforming based on channel information measured by the UE.

In the legacy multi-antenna system, the BS performs fixed analog beamforming, and thus the UE reports only one value of RSRP measurement. If the BS has multiple beamforming patterns, a method for selecting a beamforming pattern suitable for data transmission is needed.

As a first method, the BS generates multiple analog beams, and the UE measures a synthesized channel generated by beamforming and reports the same to the BS.

For example, channel information that the UE needs to measure is designated with an antenna port, and RSRP measurement is performed on multiple antenna ports. Multiple pieces of RSRP information measured by the UE are reported over a relevant reporting channel. In this case, the RSRP information may be reported along with information related to the antenna port. In addition, as a method to compress the size of the information, only some RSRPs in the information measured by the UE may be reported. In this case, RSRP information and a relevant indicator are reported together. For example, antenna port indexes may be arranged in order, and a bit flag of one antenna port selected from a bit string may be turned on.

As another example, channel information that the UE needs to measure is designated with an antenna port, and RSRP measurement is performed on one antenna port. In this case, a unit in which the measurement is performed may be defined as a time unit. For example, a time unit in which measurement is to be performed is designated through a higher layer signal, and the measured information is reported in the time unit. Herein, multiple time units may be configured. The measured information is reported in a reporting order determined according to respective time units. When multiple pieces of information are reported simultaneously, the ordering of the pieces of information may be designated. In reporting the information on individual resources, the information may be configured for each of the resources.

As a second method, the UE synthesizes channels using an agreed analog beamforming set, and measures and reports the synthesized channels to the BS.

For example, the BS transmits an RS for an antenna element on which analog beamforming is not performed. The BS signals a set for performing analog beamforming to the UE and the UE combines the antenna element with a beamforming weight using the indicated set. Then, RSRP measurement is performed based on the synthesized channels. The UE may report all measured channel information to the BS. Alternatively, the UE may report only some set information preferred by the UE in order to compress the information.

In addition, the aforementioned methods may be performed according to an instruction from the BS or the capability of the UE. There may be a UE supporting the aforementioned method and a UE which does not support the method. The UEs report the capabilities thereof to the BS. The BS may instruct the UE having a capability to use the aforementioned reporting method. The UE may perform a new measurement method according to an indicator of the BS.

As a third method, the BS performs the measurement and determination operations. Specifically, the BS measures channel states through an uplink signal, and determines a weight for analog beamforming for downlink signal transmission.

The BS may determine the weight for analog beamforming through the receive terminal. This operation may be implemented by a hardware structure or signal processing method for uplink signal processing in various manners. When multiple UEs transmit signals simultaneously, the received signals include signals and channels which serve various purposes. Among the signals, a reference signal for channel measurement is distinctively used to perform channel measurement for uplink transmission.

For example, when an analog-beamformed signal received on uplink is used, an analog beamforming weight is determined using a reference signal for data transmission. The reference signal for data transmission has undergone digital beamforming. Accordingly, various analog beamforming operations may be performed to discover an optimum analog beamforming value. Reference signals for data transmission of a user are extracted from multiple analog-beamformed signals. Channel states of the multiple analog-beamformed reference signals for data transmission are measured, and an analog beamforming weight is selected based on the measured channel states.

As another example, received signals for respective antenna elements may be collected on uplink to determine a weight for performing analog beamforming. In this case, a reference signal for channel state measurement of the UE may be extracted from the received signals.

An analog beamforming weight for downlink transmission is determined based on the analog beamforming weights selected through the foregoing examples. The analog beamforming weight for downlink transmission may change in a time unit. The synthesized downlink channel also changes according to the weight changing in the time unit, and a corresponding RSRP measurement method is required. The BS may designate a time unit in which RSRP measurement is performed for the UE.

Embodiment 4

Embodiment 4 of the present invention relates to a method for compensating a phase difference between narrowbands.

When analog beamforming is used, an undesired beam is transmitted due to a phase difference between a high frequency and a low frequency which occurs in wideband transmission.

Analog beamforming is basically synchronizing phases of signals in a desired direction by differing times to transmit (or receive) the signals according to the direction in which the signals are transmitted (or received) with respect to an array of multiple antennas. Since the phase of a sine wave varies with time, transmission (or reception) delay may mean that the phase of a signal is changed. The phase change according to transmission (or reception) delay varies according to the frequency used for transmission (or reception). In the same delay situation, a small phase change occurs at a low frequency, while a large phase change occurs at a high frequency.

For analog beamforming, multiplication with a weight is performed in the analog domain to perform multi-antenna transmission or reception. That is, a beamforming weight is constantly used in a transmission band. If the transmission band is narrow, the difference in phase change between a high frequency and a low frequency is small within the band. However, if the transmission band is wide, the difference may be large. In addition, if the central frequency used for transmission is low when the same transmission band is used, difference in phase change is small within the transmission band. If the central frequency is high, the difference may be large.

Hybrid beamforming is likely to be used for wideband transmission or high frequency band transmission.

In the case of high-frequency transmission, for example, the legacy cellular system (e.g., LTA) is designed to perform transmission mainly in a band around 2 GHz with a maximum bandwidth of 20 MHz, but transmission in a higher band (around, for example, 3.5 GHz, 5 GHz, etc.) is recently under discussion.

In addition, to increase the transmission capacity, high-frequency wideband transmission, for which a wide frequency band may be secured, is attempted. Among the bands higher than or equal to 5 GHz, the bands around 10 GHz, 28 GHz and 60 GHz have been proposed as frequency bands for future generation wideband mobile communication.

Introduction of massive MIMO to the aforementioned wideband and high-frequency band transmission situations is under discussion. In addition, as a method to simplify implementation of massive MIMO, hybrid beamforming is likely to be introduced. The phase difference between frequency bands which occurs when analog beamforming is applied to wideband transmission is a challenge that needs to be overcome to improve performance of hybrid beamforming.

The basic principle of beamforming is that transmitted and received signals are caused to have the same phase through linear phase rotation between antennas to obtain maximum gain when the signals are synthesized. The value of linear phase rotation to be adopted between antennas varies among bands. If one representative value of phase rotation is applied to wideband transmission, maximum gain may be not be obtained when the signals are synthesized because of the difference between the representative value and the linear phase values that should be applied to the antennas according to the bands. In an extreme case, sympathies of signals may result in attenuation of the signal amplitude depending on the amount of phase change. Beam direction mismatch according to phase difference may occur more sensitively as the beam becomes sharp. On the other hand, for a broad beam, beam direction mismatch according to phase difference may occur less sensitively. In massive MIMO, energies are combined using many antennas, and thus extremely sharp beams may be generated. Accordingly, beam direction mismatch according to phase difference occurs sensitively in massive MIMO.

A cause of the phase difference and corresponding sensitivity are described below. When the same phase rotation is applied to a wideband, a phase difference is produced. Herein, as the beamwidth decreases, the sensitivity increases. On the other hand, if the same phase is applied to a narrowband, a small phase difference is produced. In addition, as the beam becomes broad, sensitivity to phase difference is lowered.

In this embodiment, it is proposed that a broad beam be generated in the analog domain and phase rotation be applied to a narrowband in the digital domain. To this end, this embodiment proposes an antenna configuration method and a method for configuring and applying a precoder of a digital beamformer.

Embodiment 4-1

Embodiment 4-1 relates to generation of a broad beam in the analog domain and application of phase rotation to a narrowband in the digital domain.

According to the method of Embodiment 4-1, broad beams are generated by reducing the number of elements for performing beamforming in the analog domain. Thereby, sensitivity to change in the beam direction according to the phase change is lowered. In addition, phase differences among the antenna elements are averaged on a synthesized channel, a sharp beam is formed in a desired direction by applying digital beamforming to synthesized channels containing the average phase difference.

Embodiment 4-2

Embodiment 4-2 relates to the structure of an antenna array. Specifically, antenna subgrouping is performed on a row or column having two or more antenna elements.

Analog beamforming changes the phase and amplitude for antenna elements. Antenna elements may be grouped into subgroups, and analog beamforming may be performed for each subgroup. To generate an analog beam having a broad beamwidth, analog beamforming is performed using a small number of antenna elements. To this end, two or more antenna subgroups are configured.

Figure 26:
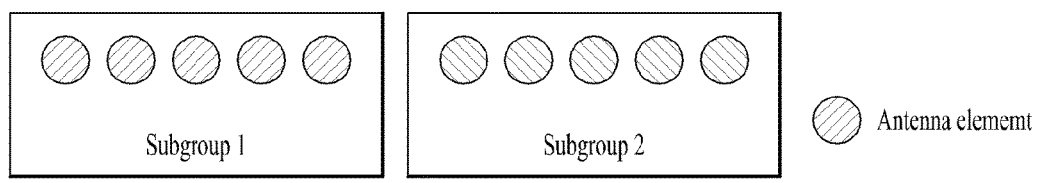
FIG. 26 illustrates an exemplary structure of an antenna array according to an embodiment of the present invention.

FIG. 26 illustrates an exemplary structure of an antenna array according to an embodiment of the present invention.

Referring to FIG. 26, when 10 antenna elements are arranged in a row, two subgroups may be configured by grouping every five antenna elements into one subgroup. In this case, two beams having a beamwidth greater than the beamwidth produced using 10 antenna elements are formed. A beam generated by each subgroup is more robust to phase error than the beams of the 10 antenna elements.

Figure 27:
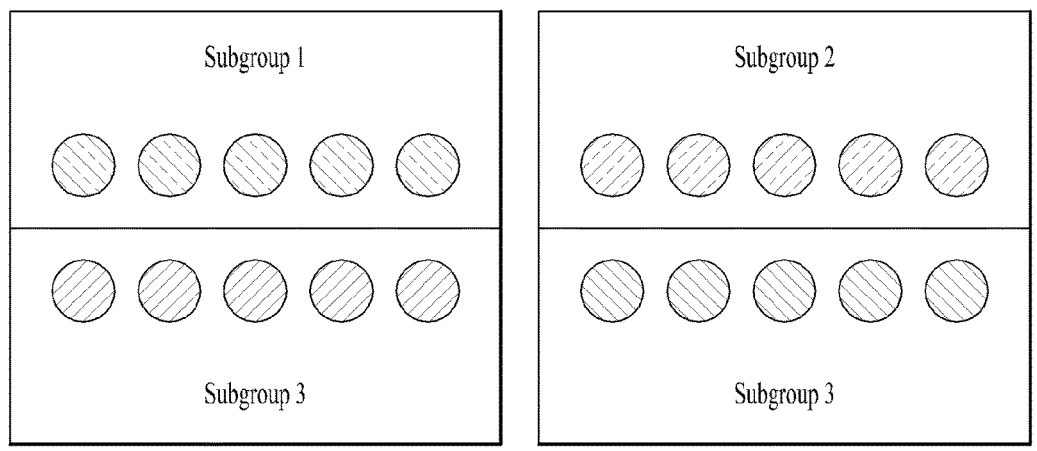
FIG. 27 illustrates another exemplary structure of an antenna array according to an embodiment of the present invention.

FIG. 27 illustrates another exemplary structure of an antenna array according to an embodiment of the present invention.

Referring to FIG. 27, if 20 antenna elements are arranged such that each row has 10 antenna elements (10×2), and every 5 antenna elements are grouped into one subgroup, each row may have two subgroups and thus four subgroups may be configured.

Embodiment 4-3

Embodiment 4-3 relates to a method for compensating phase difference between narrowbands which occurs when analog beamforming is applied to a wideband. Specifically, a method for applying beamforming weights having the same amount of phase change to the respective elements may be used.

For example, in the case of FIG. 26 where 5 antenna elements from the same row are grouped into one subgroup, when precoding weights applied to the 5 antenna elements in the subgroup are defined as $W=[W0\ W1\ W2\ W3\ W4]$, a beamforming weight $W$ having the same phase change is applied to each subgroup. $W1$ and $W2$ are defined as follows.

$$W1=[1\ \exp j(\alpha)\exp j(2\alpha)\exp j(3\alpha)\exp j(4\alpha)],$$

$$W2=[\exp j(\beta)\exp j(\beta)*\exp j(\alpha)\exp j(\beta)*\exp j(2\alpha)\exp j(\beta)\\ *\exp j(3\alpha)\exp j(\beta)*\exp j(4\alpha)]$$

$W1$ and $W2$ have the same amount of phase change of precoding weights applied to the respective elements as $\exp j(\alpha)$.

In addition, when each row is configured by two subgroups in the example of FIG. 27, weights having the same amount of phase change for the respective elements may be applied to subgroups 1, 2, 3 and 4. W1 to W4 are defined as follows.

$W1=[1\exp j(\alpha)\exp j(2\alpha)\exp j(3\alpha)\exp j(4\alpha)]$ $W2=[\exp j(\beta)\exp j(\beta+\alpha)\exp j(\beta+2\alpha)\exp j(\beta+3\alpha)\exp j(\beta+4\alpha)]$ $W3=[\exp j(\gamma)\exp j(\gamma+\alpha)\exp j(\gamma+2\alpha)\exp j(\gamma+3\alpha)\exp j(\gamma+4\alpha)]$ $W4=[\exp j(\gamma+\gamma)\exp j(\gamma+\beta+\alpha)\exp j(\gamma+2\alpha)\exp j(\gamma+3\alpha)\exp j(\gamma+\beta+4\alpha)]$ The elements of Wn have the same amount of phase change as $\exp j(\alpha)$. In addition, elements from different rows which are in the same column have the same amount of phase change as $\exp j(\gamma)$ (W1(1)=1, W3(1)=$\exp j(\gamma)$), (W2(4)=$\exp j(\beta+4\alpha)$, W4(4)=$\exp j(\gamma+\beta+4\alpha)$).

Embodiment 4-4

In Embodiment 4-4, performing digital beamforming per narrowband is described.

A new channel is established in a subgroup through an analog beam. There may be a phase difference between channels generated in the respective subgroups. The phase difference is compensated for using a precoder of the digital domain. Channels may change significantly, correlation between channels of the subgroups may be low, or the phase difference between channels of the samples may change according to narrowbands if the transmission band is wide. The digital beamformer serves to compensate for the phase difference between the subgroups, and performs precoding in the digital domain on the narrowband basis.

For example, when a channel of Subband k generated by analog beamforming of Subgroup n is Ch n(k), suppose that the phase of Ch n(k) is ∠Ch n(k).

The phase difference between Ch1(1) of Subgroup1 and Ch2(1) of Subgroup2 in Subband 1 is defined as a=∠Ch1(1)−∠Ch2(1), and the phase difference between Ch1(2) of Subgroup1 and Ch2(2) of Subgroup2 in Subband 2 is defined as b=∠Ch1(2)−∠Ch2(2). If the difference between the subbands is large, the channels of the subbands are independent of each other, and the phase differences a and b for the respective subbands have different values. By performing precoding for each subband, the phase difference caused by analog beamforming is compensated for.

When it is assumed that correlation between antennas is significantly high, channels of the respective antenna elements are approximated with linear phase change. The difference in the amount of phase change between the antenna elements of the channels of subbands 1 and 2 is 2δ, the channels of Subbands 1 and 2 may be expressed as follows.

$H(1)=[H1(1)H2(1)]=H(1)\times[1\exp j(\alpha-\delta)\exp j(2\alpha-2\delta)\exp j(3\alpha-3\delta)\exp j(4\alpha-4\delta)\exp j(5\alpha-5\delta)\exp j(6\alpha-6\delta)\exp j(7\alpha-7\delta)\exp j(8\alpha-8\delta)\exp j(9\alpha-9\delta)]$ $H(2)=[H1(2)H2(2)]=H(2)\times[1\exp j(\alpha+\delta)\exp j(2\alpha+2\delta)\exp j(3\alpha+3\delta)\exp j(4\alpha+4\delta)\exp j(5\alpha+5\delta)\exp j(6\alpha+6\delta)\exp j(7\alpha+7\delta)\exp j(8\alpha+8\delta)\exp j(9\alpha+9\delta)]$ When precoding weights having phase increased by $\exp j(\alpha)$ are applied to the two subgroups, the following equations are used.

$W1=[1\exp j(\alpha)\exp j(2\alpha)\exp j(3\alpha)\exp j(4\alpha)]$ $W2=[\exp j(\beta)\exp j(\beta+\alpha)\exp j(\beta+2\alpha)\exp j(\beta+3\alpha)\exp j(\beta+4\alpha)]$ Using the precoding weights above, the following synthesized channels may be obtained.

$$Heq(1) = [Heq1(1) Heq2(1)]$$
$$= [H1(1)W1H\ H2(1)W2H]$$
$$= 5H(1)\exp j(-2\delta)|1\exp j(-5\delta)|$$

$$Heq(2) = [Heq1(2) Heq2(2)]$$
$$= [H1(2)W1H\ H2(2)W2H]$$
$$= 5H(2)\exp j(2\delta)[1\exp j(-5\delta)]$$

The digital beamformer compensates for the phase difference between the subgroups. If the correlation between the antenna elements is low or the antenna elements are far from each other, the antenna elements have independent channels. In this case, when the channels are synthesized through beamforming, the amount of phase change on the antenna elements does not increase linearly.

Embodiment 4-5

Embodiment 4-5 relates to a method for reporting channel states to support digital beamforming.

To support downlink digital beamforming, CSI needs to be reported. Methods for reporting the CSI may include implicit feedback of reporting an agreed index value (e.g., Rank Indication/Precoding Matrix Indication/Channel Quality Indication, etc.) into which the CSI is converted and explicit feedback of directly reporting the channel. In both cases, channel information measured on the narrowband basis is reported to the BS. Herein, the channel information refers to CSI estimated based on information about channels synthesized by analog beamforming for each subgroup.

The UE may estimate channel states of antenna elements of a subgroup, and discover and report a weight proper for beamforming. In this case, the UE reports a beamforming weight to be applied to the subgroup to the BS. The beamforming weight is selected and reported on the assumption that the beamforming weight is applied to the transmission bandwidths in common.

Embodiment 5

Embodiment 5 relates to a method for transmitting a training sequence for analog BF in hybrid BF.

To perform downlink beamforming, the BS needs to acquire downlink channel information. To this end, (1) the UE may measure and report a downlink channel, or (2) the BS may measure an uplink channel and use the same for downlink transmission. In this embodiment, a description will be given of a reference signal transmission method and physical signal structure which are used for the UE to measure a downlink channel in downlink hybrid beamforming.

A reference signal for the digital beamforming technique is designed such that orthogonal resources (frequencies, times, codes, etc.) are allocated to the antenna ports to acquire channel information about the respective antenna ports.

However, the reference signal defined for the antenna ports is not proper for the operation of distinguishing and estimating channels of antenna elements. For example, when N antenna ports are mapped to N TRXs, and each TRX performs transmission through M antenna elements, an orthogonal resource allocated to one antenna port is transmitted through M antenna elements, and the receive terminal synthesizes the signals of the M antenna elements and receives the same as a signal of one antenna port.

That is, if a reference signal allocated to estimate channels of antenna ports is used, a channel created by synthesized signals of multiple antenna elements is estimated, and thus the M antenna elements are undistinguishable from each other. Accordingly, to estimate the channels of antenna elements, a new method for transmitting a reference signal needs to be introduced.

Hereinafter, a description will be given of a method for transmitting downlink reference signals according to the present invention.

As a first method for transmitting reference signals for antenna elements in the digital domain, antenna element specific resources are allocated. This method may be used for simultaneous transmission or transmission at different times. In this case, the phase of the reference signals for antenna elements may be reversed in consideration of analog beamforming.

As a second method for transmitting a reference signal for antenna elements in the digital domain, beam specific resources may be allocated.

Figure 28:
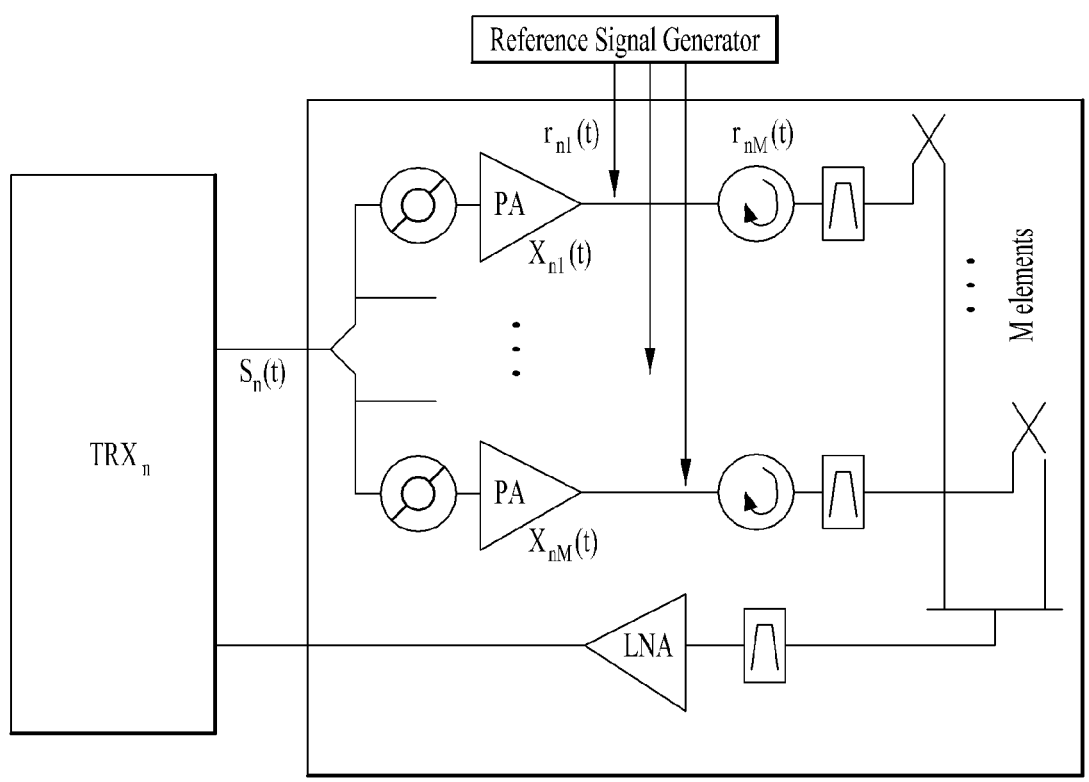
FIG. 28 illustrates an exemplary structure of a reference signal generator according to an embodiment of the present invention.

As a third method for transmitting reference signals for antenna elements in the analog domain, a reference signal generator may generate a reference signal sequence and synthesize the same with a signal generated from a TRX. FIG. 28 illustrates an exemplary structure of the reference signal generator according to an embodiment of the present invention.

Referring to FIG. 28, when TRXs are mapped to independent antenna elements, resources (n×M) distinguished by antenna elements may be used. Alternatively, when TRXs are mapped to independent antenna elements, resources (M resources) distinguishing among M elements may be used. When signal transmissions are performed simultaneously in the time domain, reference signals may be synthesized and transmitted using antenna switching.

If the channel of an antenna element mapped to a single TRX is estimated, channels of the respective antenna elements may be estimated.

For example, training sequences are transmitted according to the respective antenna elements. Regarding the physical structure, a block to generate reference signals distinguished from signals transmitted from the TRXs is used.

Herein, the sequences represent orthogonal sequences for the antenna elements. When the sequences are transmitted at the same time, they may be distinguished by frequency resources/code resources. In addition, a sequence may be transmitted together with a data signal.

An antenna port refers to a signal synthesized by analog beamforming, and an antenna element refers to a unit forming the basis of analog beamforming. To select a beamforming weight for performing analog beamforming, channel measurement on the antenna elements is required. To acquire spatial information about the antenna elements, various reference signal transmitting methods may be used. Reference signals for the antenna elements may be transmitted in the digital domain or analog domain.

Embodiment 5-1

According to Embodiment 5-1, when a reference signal is transmitted in the digital domain, analog beamforming is not performed for a duration of transmission of the reference signal. To this end, a specific resource is allocated to each antenna element. Herein, the resource refers to a time, a frequency, a code, or the like.

For example, reference signals may be configured to be transmitted at different times for respective antenna elements. When a reference signal is transmitted in the digital domain, time taken for the transmission is at least one OFDM symbol duration. A reference signal for one antenna element is transmitted for one OFDM symbol duration, and a reference signal for another antenna element is transmitted for the next time duration.

A signal branching into the respective antenna elements is generated by one TRX. If the same signal is transmitted from the respective elements at the same time, it is difficult for the receive terminal to acquire reference signals corresponding to the respective antenna elements. As a method for distinguishing between the reference signals for the respective antenna elements in transmitting the signals, turning on/off antennas may be performed. For example, a signal to be transmitted from an antenna element may be amplified or attenuated by reducing gain of the power amplifier of the antenna element. At a specific time, the PA of one antenna element is amplified, while the PAs of the other antenna elements are attenuated. This operation is performed for the respective antenna elements in rotation. Even if the same reference signal is transmitted from the antenna elements, only one antenna may be caused to transmit the reference signal by turning on/off the antenna elements.

As another example, reference signals may be transmitted at times agreed upon among the antenna elements to prevent the reference signals from being synthesized. Considering antenna subgroups, time orthogonal reference signal resources may be allocated to the antenna elements contained in one antenna subgroup, and frequency orthogonal resources or code resources may be allocated to antenna elements from different antenna subgroups.

Since the same reference signal is transmitted from the respective antenna elements in one antenna subgroup, antenna element transmissions are distinguished from each other by time. On the other hand, subgroups are capable of generating independent signals, and thus different reference signals may be transmitted from the respective subgroups. Accordingly, reference signals provided with different frequency orthogonal resources or code resources may be allocated to the subgroups and transmitted. Moreover, the reference signals may be transmitted by assigning different time resources.

Embodiment 5-2

Embodiment 5-2 relates to a method for transmitting an analog-beamformed reference signal when the reference signal is transmitted in the digital domain. To this end, a specific resource is allocated to each analog beam.

Transmitting an analog-beamformed reference signal means that a reference signal for distinguishing an analog beamforming weight set from the other possible analog beamforming weight sets is allocated. Resource allocation may be configured to be performed independently in a beamforming unit to allocate a reference signal for distinguishing one beamforming operation from another. In this case, complexity may be significantly lowered, compared to the complexity obtained when a precoding weight for performing analog beamforming is discovered by measuring channels for the respective antenna elements.

Embodiment 5-3

Embodiment 5-3 relates to a method for transmitting reference signals for antenna elements in the analog domain.

The reference signal generator as illustrated in FIG. 28 generates a reference signal sequence and synthesizes the same with a signal generated from a TRX. In this case, the reference may be allocated to an antenna element specific resource. For example, when time orthogonal resources are allocated, the respective antenna elements use independent time resources. In this case, a time resource may be designed to have a length shorter than one OFDM symbol. As another example, code resources may be allocated. Different code resources may be used for the respective antenna elements to distinguish between respective antenna channels. When a ZC sequence is used, signals may be distinguished from each other using different cyclic shift values.

If TRXs are mapped to independent antenna elements, N*M resources distinguished by the antenna elements may be used. If a reference signal is used to distinguish between signals of the respective antenna elements in a TRX, an antenna element may be shared between TRXs, and an antenna element resource may be independently allocated in a TRX.

Training sequences allocated to the respective antenna elements may be transmitted. In generating and transmitting a signal in the analog domain, orthogonal resources distinguished by time may be allocated to the respective antenna elements. In this case, it may take a considerable time to estimate the channels of the antenna elements for performing analog beamforming. In addition, if a training sequence is transmitted at a time distinguished from a time for which signals for data transmission are transmitted, the time for data transmission may be shortened by nature of analog signals, and thus system performance may be degraded.

According to this embodiment, training sequences are transmitted in the analog domain with the data transfer rate maintained.

As a first method for this embodiment, a training sequence for analog beamforming and an existing signal may be synthesized and transmitted in the analog domain. These two signals are synthesized in a superposition manner, and the synthesized signals are transmitted simultaneously. The training sequence or the existing signal is repeatedly transmitted, and covered by an orthogonal code.

For example, the training sequence and the existing signal are repeatedly transmitted and mapped to an orthogonal code cover. A physical signal structure is shown below. $h\_n(t)$ denotes a channel impulse response at time t. $s\_k(t)$ denotes a training sequence transmitted through the k-th antenna element, and $r\_k(t)$ denotes an existing signal transmitted through the k-th antenna element. After N time units, the channel and the received signal are expressed with t+N.

$$y(t)=h\_k(t) \square (s\_k(t)+r\_k(t))+n(t)$$

$$y(t+N)=h\_k(t+N) \square (s\_k(t)-r\_k(t))+n(t+N)$$

A signal for one OFDM symbol may be repeated over two OFDM symbols. Alternatively, a signal may be repeatedly transmitted within one OFDM symbol period.

Repetitive synthesis of signals in the analog domain may be determined in association with a period for which a signal is generated and repeated in the digital domain.

A desired signal may be restored from a signal synthesized and transmitted as described above through simple addition/subtraction.

$$y(t)+y(t+N)=h\_k(t) \square (s\_k(t)+r\_k(t))+n(t)+h\_k(t+N)$$
$$\square (s\_k(t)-r\_k(t))+n(t+N)$$

When it is assumed that the channel undergoes little change, it may be considered that $h\_k(t)=h\_k(t+N)$, and thus the following equation may be obtained.

$$y(t)+y(t+N)=h\_k(t) \square (s\_k(t)+r(t)+s\_k(t)-r\_k(t))+n(t)+n(t+N)$$

If the existing signals transmitted through the respective antenna elements are all mapped to $r\_n(t)$ and $-r\_n(t)$, and $s\_k(t)$ is mapped to antenna elements, the following equation may be obtained.

$$y(t)+y(t+N)=(h\_1(t) \square 2(s\_1(t)))+ \ldots +(h\_k(t) \square 2(s\_k(t))+n(t)+n(t+N)$$

That is, signals of the respective antenna elements may be distinguished from each other using time orthogonal resources or orthogonality of code resources.

Embodiment 6

Embodiment 6 relates to an uplink reference signal for hybrid beamforming.

According to Embodiment 6, a training sequence is transmitted to allow multiple users to select weight vectors for downlink beamforming on UL.

Hereinafter, a description will be given of a method for variably performing uplink reception analog beamforming.

For uplink reception analog beamforming, a BS selects a beamforming weight proper for analog beamforming from a received signal. To this end, the BS needs to have a function of selecting an analog beamforming weight.

An analog beamforming weight selector selects a proper beamforming vector by applying a beamforming weight vector for analog beamforming to signals received from the respective antenna elements. To this end, the BS may use signals transmitted from the UE. PRACH, SRS, DMRS, PUSCH, and PUCCH may be possible candidates.

Preferably, a precoding weight is selected using signals obtained by performing time and frequency synchronization of transmitting signals. This is because timing/frequency synchronization affects precoding weight selection. Accordingly, using PRACH is not desirable.

As a first example which is easy to implement, the SRS may be used.

The SRS is used as information for acquiring CSI of a UE to perform determination of MCS and transmission precoding for uplink transmission and band allocation. In addition, the SRS is used as information for determining downlink transmission precoding. Channel information is acquired from the SRS to perform digital beamforming. A channel estimated through the SRS is acquired through signal processing in the digital domain.

The legacy SRS is transmitted through one OFDM symbol, and frequency and code resources within the OFDM symbol are allocated to acquire channels of multiple users and a multi-antenna channel of a single user. The frequency resources are distinguished by grouping subcarriers into a cluster (a set of contiguous subcarriers), and the subcarriers within a frequency resource distinguished by a cluster are divided in an interleaved manner (using odd-numbered subcarriers or even-numbered subcarriers). In the digital domain signal processing, multiple users may be distinguished from each other through frequency allocation performed with the aforementioned method.

However, even if resources distinguished by frequency are used, it may be difficult to distinguish among synthesized multi-user signals when the processing is performed in the time domain. If the legacy SRS is used to distinguish signals of multiple users from signals received for respective antenna elements to perform analog beamforming, (1) a signal transmission method for distinguishing signals of multiple users in the analog domain or (2) a processor for performing analog beamforming by distinguishing multi-user signals in the digital domain is needed.

Hereinafter, a description will be given of a signal transmission method for distinguishing multi-user signals in the analog domain.

Analog beamforming serves to concentrate or suppress energy of signals transmitted or received in a specific direction using a transmit weight or receive weight for each antenna element. To perform analog beamforming, a proper weight needs to be used for antenna elements. The weight may be selected based on the CSI. The CSI is measurable by the receive terminal, and may be used for reception beamforming and transmission beamforming.

The BS may acquire CSI from an uplink signal transmitted from the UE and calculate a weight for reception. This weight may be used as a transmission beamforming weight after proper calibration. In acquiring CSI through uplink signals transmitted by the UE, interference between multiple users is a big issue.

In analog beamforming, an analog terminal acquires CSI by training signals. Analog signals are processed in the time domain. If multi-user signals are transmitted at the same time, the multi-user signals are distinguished by orthogonality of transmission sequences. In a system based on OFDMA or SC-FDMA, users performing digital beamforming are assigned resources divided in the frequency domain, and thus relatively many users may be covered by digital beamforming. On the other hand, for analog beamforming, training is attempted in the time domain, and thus it is difficult to distinguish among users by using resources divided by frequency in the time domain.

To address this issue, time domain resources may be divided and transmitted through an uplink reference signal.

If N resources distinguished by frequency are usable to transmit a signal within one OFDM symbol duration, it is assumed that the capacity for distinguishing among multiple users is N. As a simple method, one OFDM symbol period may be divided into N time units and each time resource may be allocated to the UE to create the number of orthogonal resources created by N frequency resources in the time domain. However, if time resources simply divided by N are used, signal distortion may occur due to the multi-path of a spatial channel. Accordingly, even if a signal period is set to be short, a proper guard time needs to be configured.

According to this embodiment, when multiple time resources are divided within the existing OFDM symbol duration, each of the divided time resources may have a guard time.

Embodiment 6-1

Embodiment 6-1 relates to a method for dividing multiple time resources by designing a duration shorter than an OFDM symbol duration. For example, when an OFDM symbol duration consists of Nfft+Ncp samples, a short OFDM symbol duration may consist of (Nfft+Ncp)/M samples. Alternatively, the short symbol duration may consist of (Nfft/M)+(Ncp)' samples. That is, a signal having a short duration corresponding to Nfft/M is generated, and a short OFDM symbol of a short duration having about Ncp/M or (Ncp)' samples is configured.

As a method to create this short OFDM symbol, the same sampling frequency as used for the legacy OFDM symbol is used (which is intended to maintain the same sampling time), and subcarrier spacing is increased by M times. In a system having subcarrier spacing of 15 kHz, wide subcarrier spacing such as 30 kHz (M=2) or 60 kHz (M=4) may be adopted. M is a multiple of 2. If subcarrier spacing corresponding to a multiple of 2 is used, the waveform may be maintained without being distorted when the same sampling time as used for the legacy OFDM symbol is used.

When 1024 FFT is performed on the conditions of subcarrier spacing of 15 kHz, system bandwidth of 9 MHz, and guard frequency of 6.36 MHz, an OFDM symbol having 1024 samples may be obtained in the time domain. If ½ FFT (512) is performed by doubling the subcarrier spacing (to 30 kHz) with the system bandwidth (9 MHz) and the guard frequency (6.36 MHz) maintained, an OFDM symbol having 512 samples in the time domain may be obtained. This symbol has a duration exactly half the absolute time duration (1024×Ts) of an OFDM symbol having the conventional subcarrier spacing (15 kHz) since the same sampling time (Ts) is used.

The UE generates an uplink reference signal by increasing the subcarrier spacing at the same sampling frequency, converts the generated reference signal into an analog signal through a DAC and transmits the analog signal over an RF.

Embodiment 6-2

Embodiment 6-2 relates to designing a CP of a short period in a signal having an OFDM symbol duration of a short period. However, multiple users may be at different locations, and thus undergo different path losses according to the locations. Considering the different path losses of the multiple users, the CP length applied to the legacy OFDM symbol is preferably used.

Embodiment 6-3

Figure 29:
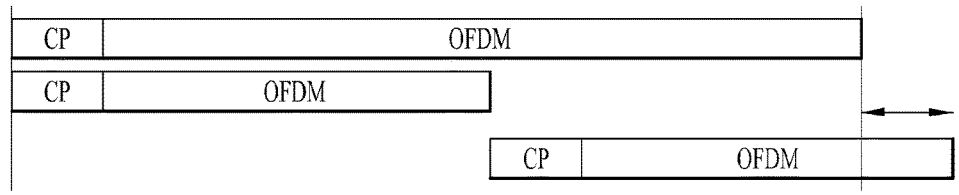
FIG. 29 illustrates an example of multiple short OFDM symbols which are longer than the existing one OFDM symbol period.

In the case of Embodiment 6-2, if multiple OFDM symbols having a short period are arranged for the legacy OFDM period, the multiple short OFDM symbols may become longer than the period of the legacy OFDM symbol. FIG. 29 illustrates a case where multiple short OFDM symbols become longer than one legacy OFDM symbol period.

Figure 30:
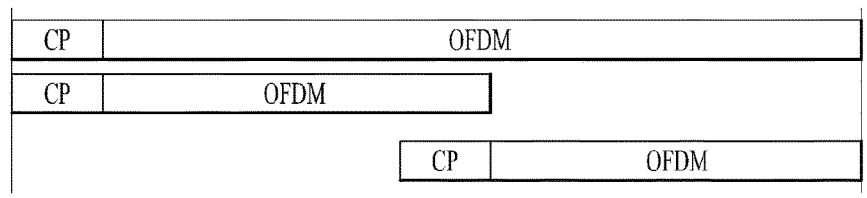
FIG. 30 illustrates a method for performing transmission such that OFDM symbols overlap.

To address this issue, Embodiment 6-3 proposes that transmission be performed with OFDM symbols overlapping each other. When there are M signals having a short OFDM symbol period, the signals are allocated to different users. FIG. 30 illustrates a method for performing transmission with OFDM symbols overlapping each other.

For example, suppose that the leading OFDM symbol of a short period is allocated to user A, and the following OFDM symbol of the short period is allocated to user B. User A transmits the leading short OFDM symbol at the existing OFDM symbol transmission time, and user B transmits the corresponding short OFDM symbol a little earlier than the existing OFDM symbol transmission time. The receive terminal may receive the short OFDM symbol transmitted by user A at the reception start time of the existing OFDM symbols, and receive the short OFDM symbol transmitted by user B at the last time at which a legacy OFDM symbol is received.

The reference signal for performing analog beamforming is utilized as a signal for acquiring approximate spatial information, and accordingly sensitivity of performance of spatial information acquisition is less affected by the reference signal when weak interference occurs between signals. In addition, if the end part of the leading OFDM symbol overlaps the CP of the following signal, the BS may minimize interference between symbols by configuring a proper time window.

Embodiment 6-4

A training sequence for performing analog beamforming is configured with an OFDM symbol of a short period. In this case, sequences (e.g., ZC sequences) having similar correlation properties may be used in the frequency and time domain as sequences mapped to the respective subcarriers. Signals generated by mapping such sequences have similar properties in the frequency domain and time domain, and are thus advantageous for the de-spreading operation performed in the time domain.

Embodiment 6-5

Embodiment 6-5 relates to a method for transmitting a reference signal or training sequence for analog beamforming at a time different from the time interval for transmission of an existing signal.

The time for which a training sequence is transmitted may be set according to an indicator delivered from the BS to the UE. The BS may indicate the transmission period of training sequences that the UEs need to transmit, different from the transmission periods of the other signals. For example, the training sequences may be configured to be transmitted at times different from the transmission period of the legacy SRS.

The UE does not transmit other signals at a time when a training sequence is transmitted. For example, if a data signal, an RACH or a control signal to be transmitted is triggered at a time to transmit a training sequence, transmission of the training sequence is prioritized.

Embodiment 6-6

Embodiment 6-6 relates to a method for performing analog beamforming by distinguishing multi-user signals in the digital domain.

As a first method, in the case where analog beamforming is performed by distinguishing multi-user signals in the digital domain, a block capable of purely extracting signals from antenna elements and performing digital processing of the signals is designed, and a weight for analog beamforming is determined based on the channels estimated for the respective antenna elements.

The UE transmits reference signals according to an instruction from the BS. The BS converts the signals received from the respective antenna elements into digital signals, and extracts reference signals from the digital signals. Analog beamforming is performed based on the channel states of the respective antenna elements acquired from the reference signals.

Such block is distinguished from a block for data demodulation. While data demodulation is performed based on a signal obtained after reception analog beamforming, the block for acquiring CSI performs signal processing based on signals directly extracted from the antenna elements.

As a second method, reference signals having undergone multiple analog beamforming operations are collected to determine a weight for performing analog beamforming.

When there are multiple signals for which analog beamforming has been performed with multiple beamforming weights, reference signals are extracted from the signals on which multiple analog beamforming operations have been performed. Signals transmitted from individual users are subjected to multiple analog beamforming operations, and reference signals of the corresponding users are extracted from the signals having undergone the multiple analog beamforming operations.

Signal strengths of the extracted reference signals are measured and compared according to an analog beamforming value. A proper analog beamforming weight is determined through comparison of the signal strengths. In the same manner, analog beamforming weight selection is attempted for many users, and selected beamforming weight values are stored. Users for which the same weight is selected are grouped into one group and this information is utilized in receiving and transmitting data.

Figure 31:
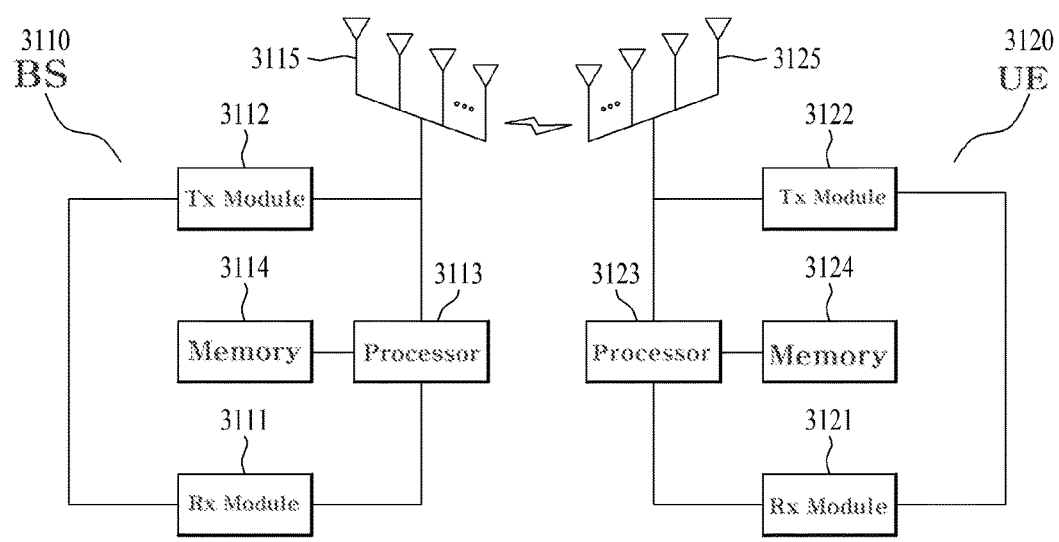
FIG. 31 illustrates a BS and a UE which are applicable to an embodiment of the present invention.

FIG. 31 illustrates a BS and a UE which are applicable to an embodiment of the present invention.

When a wireless communication system includes a delay, communication on the backhaul link is performed between a BS and the relay, and communication on the access link is performed between the relay and the UE. Accordingly, the BS or the UE shown in the figure may be replaced by the relay depending on the situation.

Referring to FIG. 31, a wireless communication system includes a BS 3110 and a UE 3120. The BS 3110 includes a processor 3113, a memory 3114 and radio frequency (RF) units 3111 and 3112. The processor 3113 may be configured to implement the procedures and/or methods proposed in the present invention. The memory 3114 is connected to the processor 3113 and stores various kinds of information related to operation of the processor 3113. The RF unit 3116 is connected to the processor 3113 and transmits and/or receives radio signals. The UE 3120 includes a processor 3123, a memory 3124 and RF units 3121 and 3122. The processor 3123 may be configured to implement the procedures and/or methods proposed in the present invention. The memory 3124 is connected to the processor 3123 and stores various kinds of information related to operation of the processor 3113. The RF units 3121 and 3122 are connected to the processor 3123 and transmit and/or receive radio signals. The BS 3110 and/or the UE 3120 may have a single antenna or multiple antennas.

The embodiments described above are constructed by combining elements and features of the present invention in a predetermined form. The elements or features should be considered selective unless explicitly mentioned otherwise. Each of the elements or features can be implemented without being combined with other elements. In addition, some elements and/or features may be combined to configure an embodiment of the present invention. The ordering of the operations discussed in the embodiments of the present invention may be changed. Some elements or features of one embodiment may also be included in another embodiment, or may be replaced by corresponding elements or features of another embodiment. It is apparent that claims which are not explicitly cited in each other in the appended claims may be presented in combination as an embodiment of the present invention or included as a new claim by subsequent amendment after the application is filed.

In this specification, a specific operation described as being performed by a BS may be performed by an upper node in some cases. That is, it is apparent that various operations performed for communication with a UE in a network constituted by a plurality of network nodes including a BS may be performed by the BS or other network nodes. The term 'BS' may be replaced with the term 'fixed station', 'Node B', 'eNode B (eNB)', 'Access Point (AP)', etc.

The embodiments of the present invention may be implemented through various means, for example, hardware, firmware, software, or a combination thereof. When implemented by hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, or the like.

When implemented by firmware or software, an embodiment of the present invention may be embodied as a module, a procedure, or a function that performs the functions or operations described above. Software code may be stored in a memory unit and executed by a processor.

The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention disclosed in the appended claims. For example, those skilled in the art can use the respective constituents disclosed in the embodiments described above in a combining manner. Thus, the present invention is not intended to be limited to the embodiments described herein, but is intended to accord with the widest scope corresponding to the principles and novel features disclosed herein.

The present invention may be carried out in specific forms other than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to accord with the widest scope corresponding to the principles and novel features disclosed herein. In addition, it is apparent that claims which are not explicitly cited in each other in the appended claims may be presented in combination as an embodiment of the present invention or included as a new claim by subsequent amendment after the application is filed.

INDUSTRIAL APPLICABILITY

The present invention is applicable to wireless communication apparatuses such as the UE, a relay and a BS.

The invention claimed is:

1. A method for transmitting a signal by a base station (BS) in a wireless access system supporting multi user-multiple input and multiple output (MU-MIMO), the method comprising:
generating, by the BS, one or more first beams for one or more subgroups each containing a plurality of user equipments (UEs) using analog beamforming;
generating, by the BS, a plurality of second beams from the one or more first beams using digital beamforming; and
transmitting, by the BS to the UEs, signals through the plurality of second beams which are generated based on a hybrid of the analog beamforming and the digital beamforming,
wherein the signals transmitted to each of the UEs are distinguished by the plurality of second beams,
wherein a weight of the analog beamforming is determined based on channel state information acquired using uplink reference signals, and
wherein a weight of the digital beamforming is determined based on a number of the one or more first beams and the weight of the analog beamforming.

2. The method according to claim 1, wherein a transmission period of the uplink reference signals is determined by adding a guard time to a time obtained by dividing a data symbol period.

3. The method according to claim 1, wherein the uplink reference signals are generated by increasing subcarrier spacing while maintaining a sampling frequency of a data symbol.

4. The method according to claim 1, wherein the uplink reference signals transmitted consecutively are partially overlapped each other in a time domain.

5. The method according to claim 1, wherein the uplink reference signals are transmitted at a time different from a time to transmit another control signal or a data signal.

6. The method according to claim 1, further comprising:
transmitting transmission period information about the uplink reference signals to the UEs.

7. The method according to claim 1, wherein the uplink reference signals are based on a sequence having similar correlation property in a frequency domain and time domain.

8. A base station for transmitting a signal in a wireless access system supporting multi user-multiple input and multiple output (MU-MIMO), the base station comprising:
a radio frequency (RF) unit including a transceiver; and
a processor,
wherein, the processor is configured to:
generate one or more first beams for one or more subgroups each containing a plurality of user equipments (UEs) using analog beamforming;
generate a plurality of second beams from the one or more first beams using digital beamforming; and
transmit, to the UEs, signals through the plurality of second beams which are generated based on hybrid of the analog beamforming and the digital beamforming,
wherein the signals transmitted to each of the UEs are distinguished by the plurality of second beams,
wherein a weight of the analog beamforming is determined based on channel state information acquired using uplink reference signals, and
wherein a weight of the digital beamforming is determined based on a number of the one or more first beams and the weight of the analog beamforming.

9. The base station according to claim 8, wherein a transmission period of the uplink reference signals is determined by adding a guard time to a time obtained by dividing a data symbol period.

10. The base station according to claim 8, wherein the uplink reference signals are generated by increasing subcarrier spacing while maintaining a sampling frequency of a data symbol.

11. The base station according to claim 8, wherein the uplink reference signals transmitted consecutively are partially overlapped each other in a time domain.

12. The base station according to claim 8, wherein the uplink reference signals are transmitted at a time different from a time to transmit another control signal or a data signal.

13. The method according to claim 1, wherein the one or more first beams corresponds to one or more antenna ports for the digital beamforming, respectively.

14. The method according to claim 1, wherein the plurality of second beams are generated by synthesizing the one or more first beams using the digital beamforming.

* * * * *